(12) United States Patent
Sawada et al.

(10) Patent No.: US 11,137,297 B2
(45) Date of Patent: Oct. 5, 2021

(54) TACTILE SENSOR, AND TACTILE SENSOR UNIT CONSTITUTING TACTILE SENSOR

(71) Applicant: Panasonic Intellectual Property Management Co., Ltd., Osaka (JP)

(72) Inventors: Yui Sawada, Osaka (JP); Tetsuyoshi Ogura, Osaka (JP); Yuta Moriura, Osaka (JP); Shinobu Masuda, Osaka (JP); Keiji Noine, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 103 days.

(21) Appl. No.: 16/577,297

(22) Filed: Sep. 20, 2019

(65) Prior Publication Data

US 2020/0018656 A1  Jan. 16, 2020

Related U.S. Application Data

(63) Continuation of application No. PCT/JP2018/011431, filed on Mar. 22, 2018.

(30) Foreign Application Priority Data

Mar. 23, 2017 (JP) .............................. JP2017-057963

(51) Int. Cl.
*G01L 1/14* (2006.01)

(52) U.S. Cl.
CPC .................................... *G01L 1/146* (2013.01)

(58) Field of Classification Search
CPC ... G01L 1/146; G01L 5/00; G01L 1/14; G01L 1/04; G01L 5/16; G01L 5/228;
(Continued)

(56) References Cited

U.S. PATENT DOCUMENTS 5,060,527 A * 10/1991 Burgess .................. G06F 3/045
73/862.68
7,698,961 B2 * 4/2010 Schostek ................. G01L 1/205
73/862.621
(Continued)

FOREIGN PATENT DOCUMENTS

CN  106211545   12/2016
JP  2001-330527  11/2001
(Continued)

OTHER PUBLICATIONS

Decision of Refusal dated Jan. 12, 2021 in corresponding Japanese Patent Application No. 2019-506971, with English Translation.
(Continued)

*Primary Examiner* — Brandi N Hopkins
(74) *Attorney, Agent, or Firm* — Wenderoth, Lind & Ponack, L.L.P.

(57) ABSTRACT

The present disclosure has an object of providing a tactile sensor having a simple structure and capable of detecting a shear force, and a tactile sensor unit constituting the tactile sensor. The present disclosure relates to a tactile sensor unit including: a plurality of pressure-sensitive elements each including a first substrate including a first electrode, a second electrode disposed facing the first electrode, and a dielectric disposed between the first electrode and the second electrode; and an external force acting portion disposed on and across the plurality of pressure-sensitive elements, wherein, when a shear force is applied to the external force acting portion, at least a part of the pressure-sensitive elements change in inter-electrode electrostatic capacitance.

20 Claims, 16 Drawing Sheets

(58) Field of Classification Search
CPC .. B25J 13/084; Y10S 901/46; G01R 27/2605; G06F 3/044; G06F 3/0414; G06F 2203/04102; G06F 2203/04103
See application file for complete search history.

(56) References Cited

U.S. PATENT DOCUMENTS

| | | | |
|---|---|---|---|
| 8,904,885 | B2 | 12/2014 | Ikebe et al. |
| 9,860,979 | B2 | 1/2018 | Ichiryu et al. |
| 2009/0031825 | A1 | 2/2009 | Kishida et al. |
| 2012/0017703 | A1* | 1/2012 | Ikebe .................. G06F 3/0446 |
| | | | 73/862.626 |
| 2012/0247226 | A1 | 10/2012 | Muroyama et al. |
| 2014/0150572 | A1 | 6/2014 | Lim et al. |
| 2016/0353567 | A1* | 12/2016 | Ichiryu .................. H05K 1/185 |

FOREIGN PATENT DOCUMENTS

| | | |
|---|---|---|
| JP | 2009-034742 | 2/2009 |
| JP | 4429478 | 3/2010 |
| JP | 2012-047728 | 3/2012 |
| JP | 2014-115282 | 6/2014 |
| JP | 2015-114308 | 6/2015 |
| JP | 5821328 | 11/2015 |
| JP | 2016-219782 | 12/2016 |
| WO | 2011/045837 | 4/2011 |

OTHER PUBLICATIONS

Office Action and Search Report dated Nov. 3, 2020 in corresponding Chinese Patent Application No. 201880018515.0, with English Translation.
Office Action dated Oct. 27, 2020 in corresponding Japanese Patent Application No. 2019-506971, with English Translation.
International Preliminary Report on Patentability dated Sep. 24, 2019 in International (PCT) Application No. PCT/JP2018/011431.
International Search Report dated Apr. 17, 2018 in International (PCT) Application No. PCT/JP2018/011431.

* cited by examiner

TACTILE SENSOR, AND TACTILE SENSOR UNIT CONSTITUTING TACTILE SENSOR

1. TECHNICAL FIELD

The present disclosure relates to a tactile sensor, and a tactile sensor unit constituting the tactile sensor.

2. RELATED ART

A tactile sensor available for robot hands and robot arms used in factories, for example, is a pressure sensor configured to detect a shear force. A robot hand provided with a tactile sensor can grab and carry a structure object that can vary in shape and weight, without applying a force more than necessary and without dropping the structure object. Tactile sensors having various structures have been known (e.g., Patent Documents 1 to 3).

For example, a tactile sensor system disclosed in Patent Document 1 includes a plurality of normal stress detection sensor units, and a sheet layer portion. The sheet layer portion includes an exterior sheet layer portion, a force detection sheet layer portion including a normal stress detection unit, and an intermediary layer sandwiched between the exterior sheet layer portion and the force detection sheet layer portion. The exterior sheet layer portion and the force detection sheet layer portion respectively have pluralities of projections respectively projecting in directions opposite to each other. The exterior sheet layer portion and the force detection sheet layer portion are disposed facing each other to allow the pluralities of projections respectively engage with each other via the intermediary layer.

For example, a detection device disclosed in Patent Document 2 includes a first substrate including a plurality of first capacitance electrodes disposed around a reference point P, a second substrate disposed facing the first substrate with the first capacitance electrodes interposed between the first substrate and the second substrate, a second capacitance electrode disposed facing the first capacitance electrodes with a dielectric interposed between the first substrate and the second substrate, and a third substrate formed with an elastic projection having a center of gravity at a position overlapping with the reference point P and configured to elastically deform due to external pressure with its tip abutting the second substrate.

For example, a tactile sensor disclosed in Patent Document 3 includes a first substrate provided with a plurality of first electrodes, a second substrate provided with a plurality of second electrodes respectively corresponding to the plurality of first electrodes, and a dielectric provided between the first substrate and the second substrate. For one first electrode of the plurality of first electrodes, a corresponding one of the second electrodes is disposed away in a direction, whereas, for another one first electrode adjacent to the one first electrode of the plurality of first electrodes, a corresponding one of the second electrodes is disposed away in another direction.

For example, a detection device disclosed in Patent Document 4 includes a pressure sensor configured to receive an external load to deform and generate stress distribution, and is configured to use a value of pressure detected by the pressure sensor, to calculate a center position of the pressure, to calculate a movement value based on the center position of the pressure, and to detect slippage.

For example, in a tactile sensor disclosed in Patent Document 5, detection elements are respectively coupled with each other with a crank coupler.

PRIOR ART DOCUMENTS

Patent Document 1 WO-A No. 2011/045837
Patent Document 2 JP-A No. 2012-47728
Patent Document 3 JP-A No. 2014-115282
Patent Document 4 JP-A No. 2009-34742
Patent Document 5 JP-A No. 2015-114308

DISCLOSURE OF INVENTION

Technical Problems to be Solved

As development of sensing technology advances, tactile sensors expand respective applications. Along with this, more stretchable tactile sensors are demanded. The inventors of the present disclosure have found that tactile sensors and tactile sensor units constituting the tactile sensors used so far are complex in structure, resulting in that a tactile sensor itself is not adequately stretchable.

The present disclosure has an object of providing a tactile sensor having a simple structure and capable of detecting a shear force, and a tactile sensor unit constituting the tactile sensor.

The present disclosure has another object of providing a tactile sensor having a simple structure, capable of detecting a shear force, and further adequately stretchable, and a tactile sensor unit constituting the tactile sensor.

SUMMARY

Means to Solve the Problems

The present disclosure relates to a tactile sensor unit including:
a plurality of pressure-sensitive elements each including a first substrate including a first electrode,
a second electrode disposed facing the first electrode, and
a dielectric (dielectric part) disposed between the first electrode and the second electrode; and
an external force acting portion disposed on and across the plurality of pressure-sensitive elements,
wherein, when a shear force is applied to the external force acting portion, at least a part of the pressure-sensitive elements change in inter-electrode electrostatic capacitance.

The present disclosure further relates to a tactile sensor including a plurality of the tactile sensor units described above.

Effects of the Invention

With a tactile sensor unit and a tactile sensor including the tactile sensor unit, according to the present disclosure, a shear force can be detected with a simple structure.

In addition, the tactile sensor unit and the tactile sensor including the tactile sensor unit, according to the present disclosure, are further adequately stretchable.

DETAILED DESCRIPTION OF PREFERRED EMBODIMENT

[Tactile Sensor Unit]

Figure 1A:
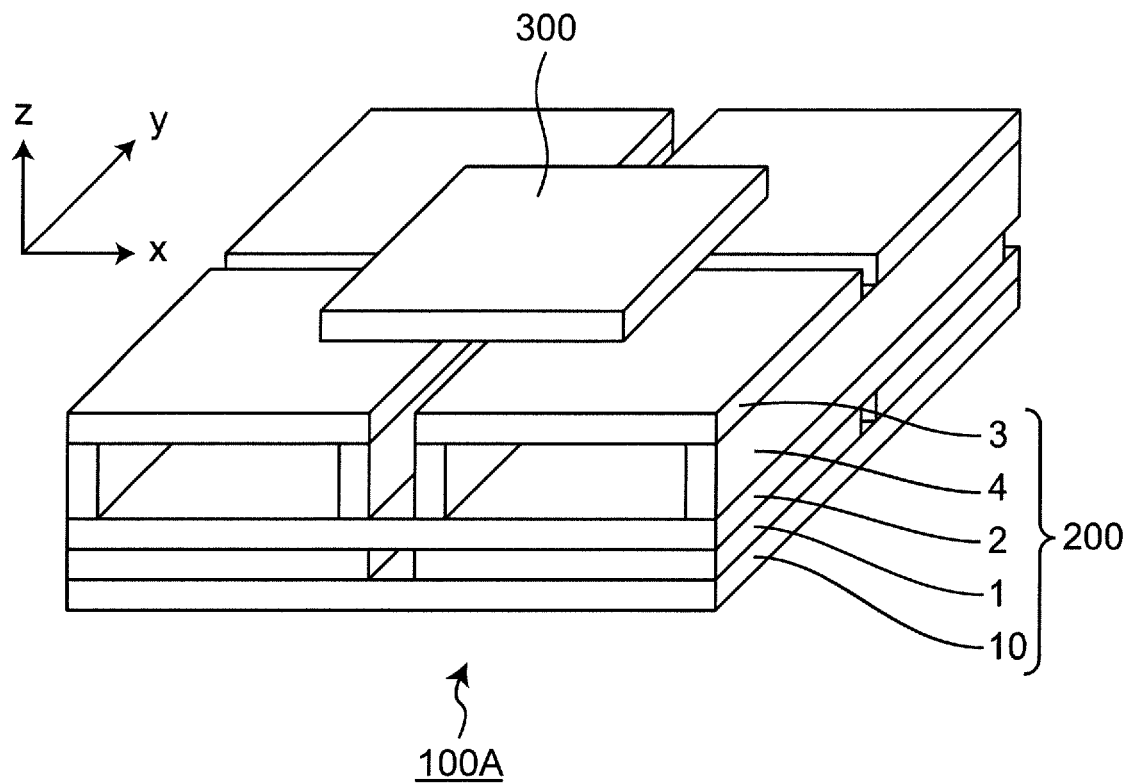
FIG. 1A: A schematic perspective view of a tactile sensor unit according to a first embodiment of the present disclosure.

A tactile sensor unit according to the present disclosure is a minimum unit of a sensing structure constituting a tactile sensor.

Based on some embodiments, the tactile sensor unit according to the present disclosure will now be described in detail with reference to the accompanying drawings. However, various components in the drawings are merely examples schematically illustrated for ease of understanding of the present disclosure. The components may differ in appearance and proportion, for example, from actual components. "Upper-lower directions", "left-right directions", and "front-rear directions" used directly or indirectly in the present description respectively correspond to upper-lower directions, left-right directions, and front-rear directions on a paper plane of each of the drawings. Unless otherwise specifically described, members or semantic contents each applied with an identical reference numeral or symbol are identical to each other, even when respective shapes differ from each other.

First Embodiment

Figure 1B:
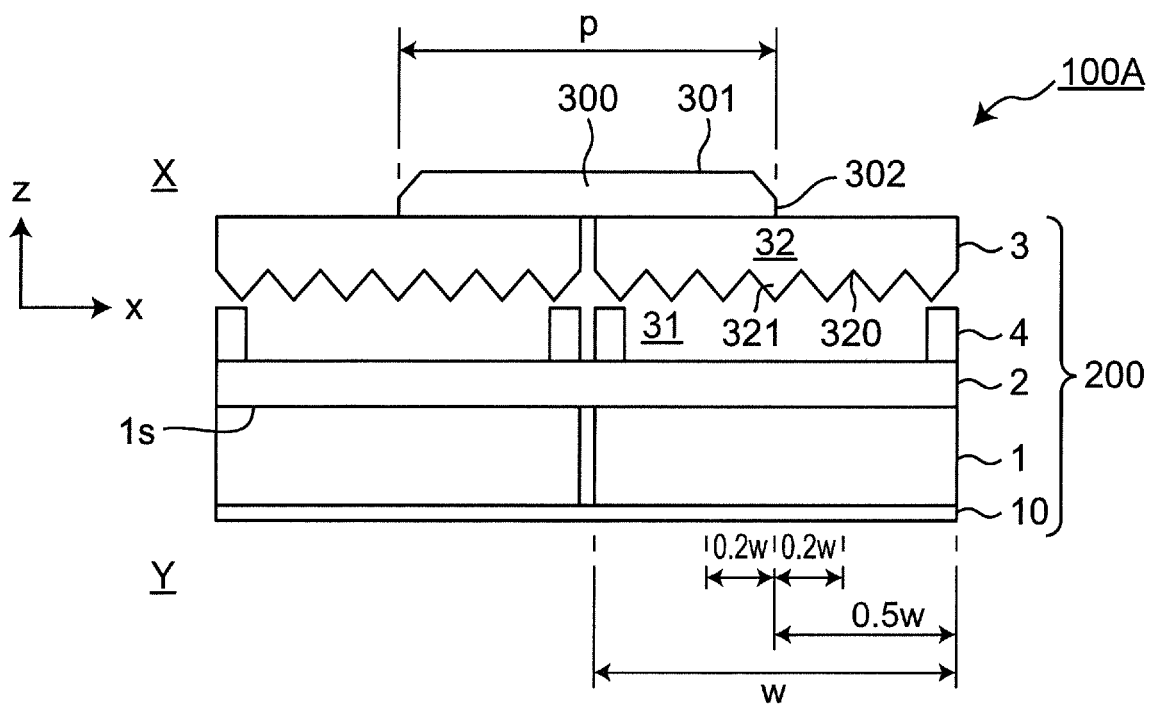
FIG. 1B: A schematic cross-sectional view of the tactile sensor unit in FIG. 1A.
Figure 1C:
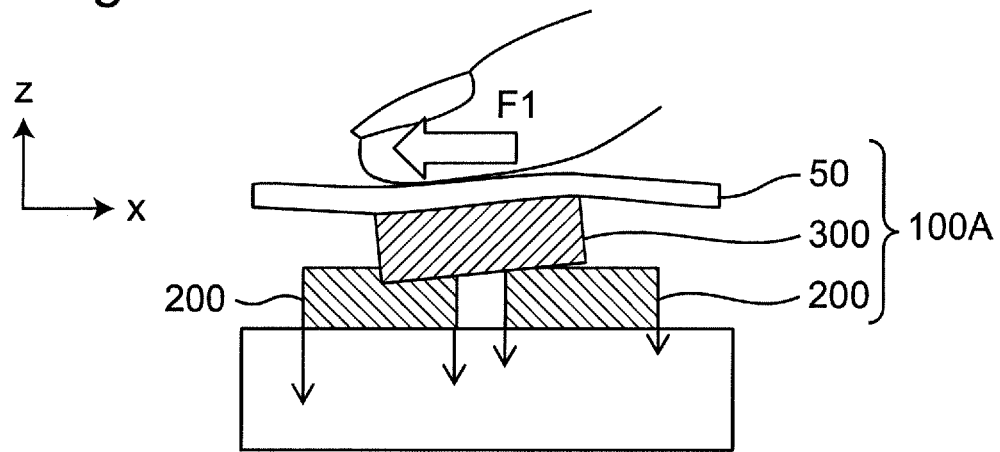
FIG. 1C: A schematic cross-sectional view for describing a mechanism of detecting a shear force in the tactile sensor unit in FIG. 1A.
Figure 1D:
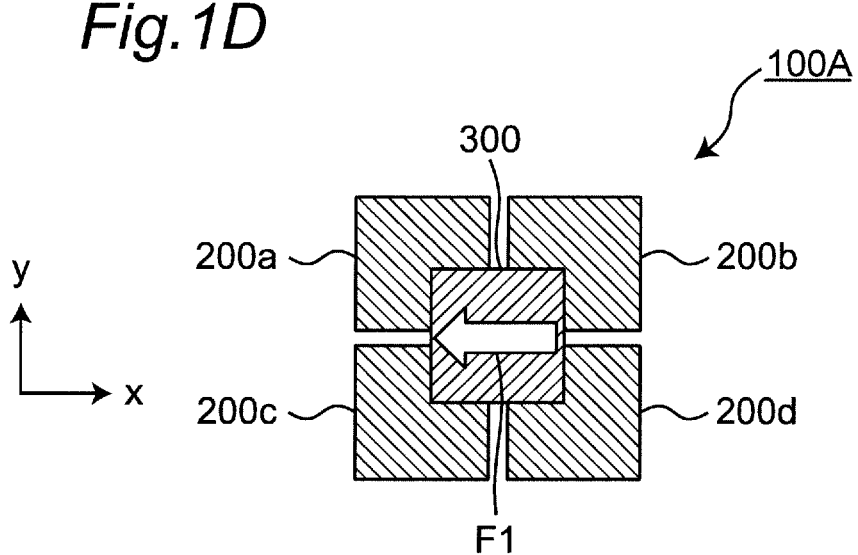
FIG. 1D: A schematic plan view of an external force acting portion and pressure-sensitive elements in the tactile sensor unit in FIG. 1C.
Figure 1E:
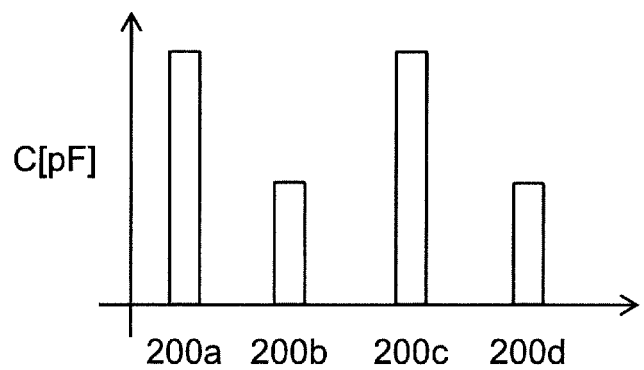
FIG. 1E: A graph illustrating an electrostatic capacitance each of of the pressure-sensitive elements when a shear force is applied in an arrow direction in the tactile sensor unit in FIG. 1D.

A tactile sensor unit 100A according to the present embodiment includes, as illustrated in FIGS. 1A and 1B, a plurality of pressure-sensitive elements 200 and an external force acting portion 300 disposed on and across the plurality of pressure-sensitive elements 200. With the external force acting portion 300 being disposed on and across the plurality of pressure-sensitive elements 200, when a shear force is applied to the external force acting portion 300, an inter-electrode electrostatic capacitance changes in at least a part of pressure-sensitive elements of the plurality of pressure-sensitive elements 200 constituting the tactile sensor unit 100A. Specifically, when a shear force is applied to a tactile sensor including a plurality of the tactile sensor units 100A, a shear force F1 is applied to the external force acting portion 300 of at least one tactile sensor unit 100A of the plurality of tactile sensor units 100A, as illustrated in FIGS. 1C and 1D. At this time, in accordance with a magnitude of the shear force F1, at least a part of the external force acting portion 300 lowers. It can be assumed that this phenomenon is caused by a turning force (moment force) acting onto the external force acting portion 300. Along with this phenomenon, inter-electrode electrostatic capacitances change based on a capacitance change characteristic described later among at least a part of pressure-sensitive elements (in FIG. 1D, 200a, 200b, 200c, and 200d) of all of the pressure-sensitive elements 200 constituting the tactile sensor unit 100A. As a result, the inter-electrode electrostatic capacitances change in the at least a part of pressure-sensitive elements in accordance with a magnitude of a shear force. For example, in the pressure-sensitive elements 200a and 200c disposed on a downstream side in an application direction of the shear force F1, as illustrated in FIG. 1E, relatively greater electrostatic capacitances are observed. For example, in the pressure-sensitive elements 200b and 200d on an upstream side in the application direction of the shear force F1, as illustrated in FIG. 1E, relatively smaller electrostatic capacitances are observed. When an electrostatic capacitance changes in a pressure-sensitive element, a magnitude of the change in electrostatic capacitance is used to detect a magnitude of a shear force. When an electrostatic capacitance changes in a pressure-sensitive element, a magnitude of the change in electrostatic capacitance and an arrangement of the pressure-sensitive element are used to detect an application direction of a shear force. FIGS. 1A and 1B respectively illustrate a schematic perspective view and a schematic cross-sectional view of the tactile sensor unit constituting the tactile sensor, according to the first embodiment of the present disclosure. In FIG. 1A, projections 321 included in a second electrode 3 in FIG. 1B are omitted. FIG. 1C is a schematic cross-sectional view for describing a mechanism of detecting a shear force in the tactile sensor unit in FIG. 1A. FIG. 1D is a schematic plan view of the external force acting portion and the pressure-sensitive elements in the tactile sensor unit in FIG. 1C. FIG. 1E is a graph illustrating electrostatic capacitances of the pressure-sensitive elements when a shear force is applied in an arrow direction in the tactile sensor unit in FIG. 1D.

A shear force denotes, when an external force is applied, a component in a parallel direction with respect to an application surface of the external force. The application surface denotes a surface being in contact with a portion (position) applied with the external force. The present disclosure can detect not only a shear force, but also normal stress of an external force (i.e., in the external force, a component in a direction perpendicular to the application surface). For example, a magnitude of normal stress can be detected from electrostatic capacitances of the pressure-sensitive elements 200a, 200b, 200c, and 200d.

In each of the tactile sensor unit 100A, the external force acting portion 300 bestrides the plurality of pressure-sensitive elements 200 constituting the tactile sensor unit 100A. Specifically, the external force acting portion 300 is disposed, in a plan view, as illustrated in FIGS. 2A to 2F, to overlap with at least a part of each of all of the pressure-sensitive elements 200 constituting the tactile sensor unit 100A (overlapped disposition relationship). More specifically, the external force acting portion 300 is disposed, in a plan view, as illustrated in FIGS. 2A to 2F, to overlap with at least a part (part or all) of each of all of the pressure-sensitive elements 200 constituting the tactile sensor unit 100A. FIGS. 2A to 2F respectively are schematic plan transparent views for describing a disposition relationship among a plurality of pressure-sensitive elements and an external force acting portion in a tactile sensor unit. The term "plan view" denotes a plan view when viewed from an upper surface, as well as, for example, a plan view when the tactile sensor unit 100A in FIG. 1B is viewed from a most-front surface 301 of (in FIG. 1B, from above) the external force acting portion 300. The term "plan transparent view" denotes a transparent view when viewed from an upper surface, as well as, in particular, a plan view when pressure-sensitive elements are viewed in a see-through manner via an external force acting portion.

It is preferable that the plurality of pressure-sensitive elements 200 constituting each tactile sensor unit have, in terms of further improvement on accuracy of detecting a shear force, in a plan view, a complementary shape configured to achieve mutual complementation among the adjacent pressure-sensitive elements, and a whole region occupied by the plurality of pressure-sensitive elements have a circular shape or a polygonal shape. The whole region occupied by the plurality of pressure-sensitive elements 200 denotes a whole region occupied by all of the pressure-sensitive elements 200 in each tactile sensor unit, as well as denotes a region including a gap region 201 among the adjacent pressure-sensitive elements. The polygonal shape may be, for example, a polygonal shape having three or more angles, such as, triangular shape, square shape, pentagonal shape, hexagonal shape, heptagonal shape, and octagonal shape. It is preferable that, whatever shape a whole region occupied by a plurality of pressure-sensitive elements has, the external force acting portion 300 be disposed on and across all of the pressure-sensitive elements 200. The complementary shape denotes a shape having a mutually fitting relationship, such as a relationship between a recess and a projection. With this relationship, a whole region occupied by all pressure-sensitive elements can be a circular shape or a polygonal shape.

Figure 2A:
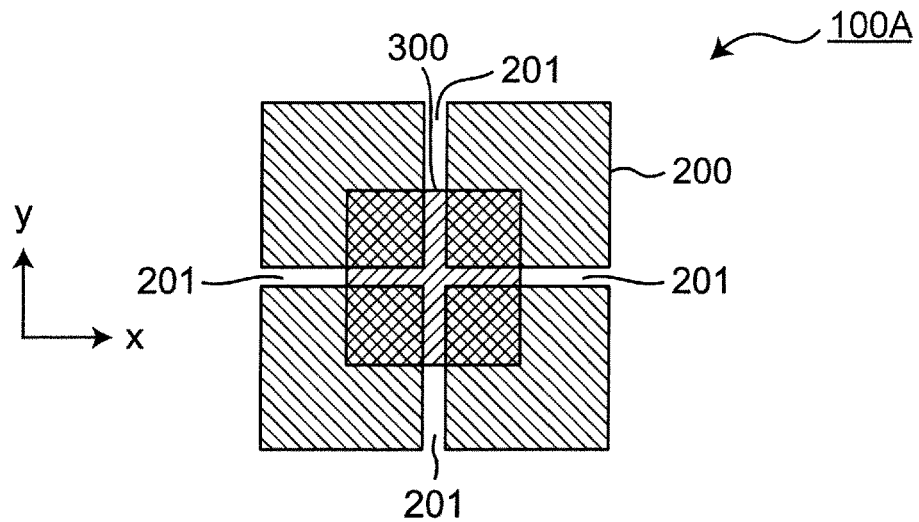
FIG. 2A: A schematic plan transparent view for describing an example of a disposition relationship among the plurality of pressure-sensitive elements and the external force acting portion in the tactile sensor unit, according to the first embodiment of the present disclosure.

For example, as illustrated in FIG. 2A, the number of the pressure-sensitive elements 200 included in the tactile sensor unit 100A is four. The four pressure-sensitive elements 200 each have a rectangular shape in a plan view, and occupy a whole region having a rectangular shape. In this case, the external force acting portion 300 is disposed to overlap with a part of each of the four pressure-sensitive elements 200.

Figure 2B:
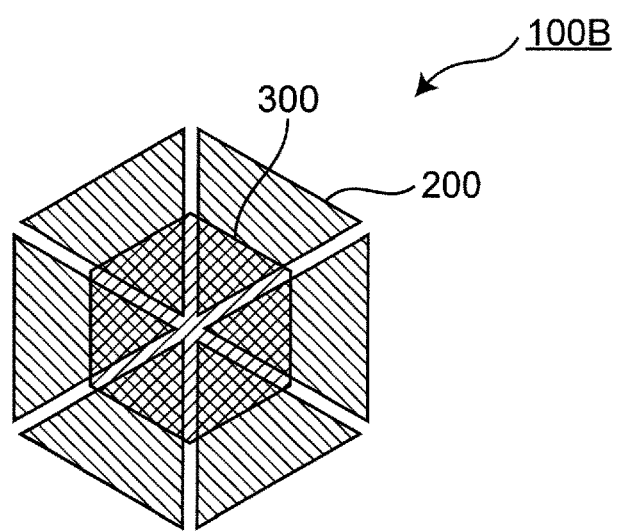
FIG. 2B: A schematic plan transparent view for describing an example of a disposition relationship among a plurality of pressure-sensitive elements and an external force acting portion in a tactile sensor unit, according to the first embodiment of the present disclosure.

For example, as illustrated in FIG. 2B, the number of the pressure-sensitive elements 200 included in a tactile sensor unit 100B is six. The six pressure-sensitive elements 200 each have a triangular shape in a plan view, and occupy a whole region having a hexagonal shape. In this case, the external force acting portion 300 is disposed to overlap with a part of each of the six pressure-sensitive elements 200.

Figure 2C:
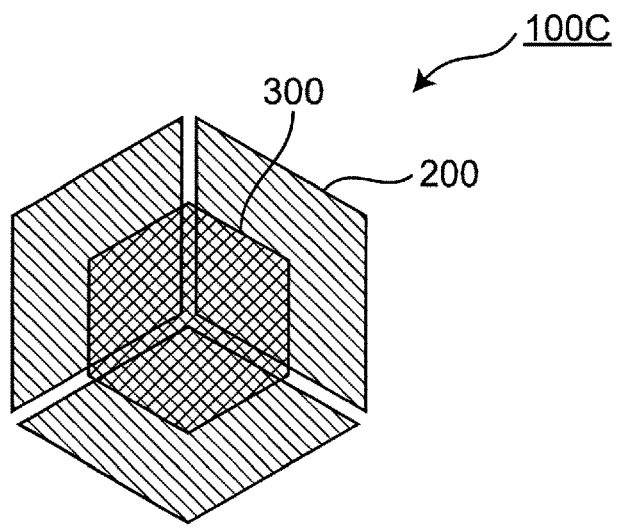
FIG. 2C: A schematic plan transparent view for describing an example of a disposition relationship among a plurality of pressure-sensitive elements and an external force acting portion in a tactile sensor unit, according to the first embodiment of the present disclosure.

For example, as illustrated in FIG. 2C, the number of the pressure-sensitive elements 200 included in a tactile sensor unit 100C is three. The three pressure-sensitive elements 200 each have a parallelogram shape in a plan view, and occupy a whole region having a hexagonal shape. In this case, the external force acting portion 300 is disposed to overlap with a part of each of the three pressure-sensitive elements 200.

Figure 2D:
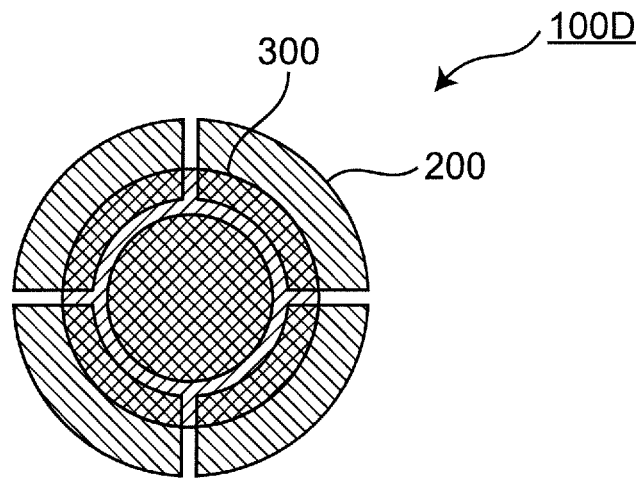
FIG. 2D: A schematic plan transparent view for describing an example of a disposition relationship among a plurality of pressure-sensitive elements and an external force acting portion in a tactile sensor unit, according to the first embodiment of the present disclosure.

For example, as illustrated in FIG. 2D, the number of the pressure-sensitive elements 200 included in a tactile sensor unit 100D is five. Each of four pressure-sensitive elements 200 of the five pressure-sensitive elements 200 has a quartered doughnut shape in a plan view. One pressure-sensitive element 200 of the five pressure-sensitive elements 200 has a circular shape in a plan view. All of the five pressure-sensitive elements 200 occupy a whole region having a circular shape. In this case, the external force acting portion 300 is disposed to overlap with a part of each of the four pressure-sensitive elements 200 each having the quartered doughnut shape, as well as is disposed to wholly overlap with the one pressure-sensitive element 200 having the circular shape.

Figure 2E:
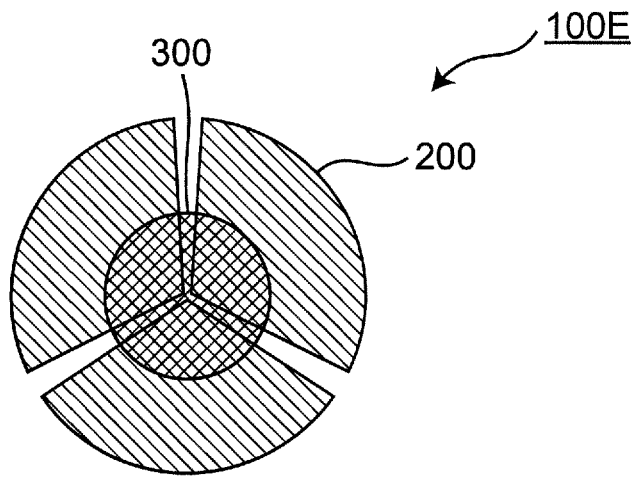
FIG. 2E: A schematic plan transparent view for describing an example of a disposition relationship among a plurality of pressure-sensitive elements and an external force acting portion in a tactile sensor unit, according to the first embodiment of the present disclosure.

For example, as illustrated in FIG. 2E, the number of the pressure-sensitive elements 200 included in a tactile sensor unit 100E is three. The three pressure-sensitive elements 200 each have a fan shape in a plan view, and occupy a whole region having a circular shape. In this case, the external force acting portion 300 is disposed to overlap with a part of each of the three pressure-sensitive elements 200.

Figure 2F:
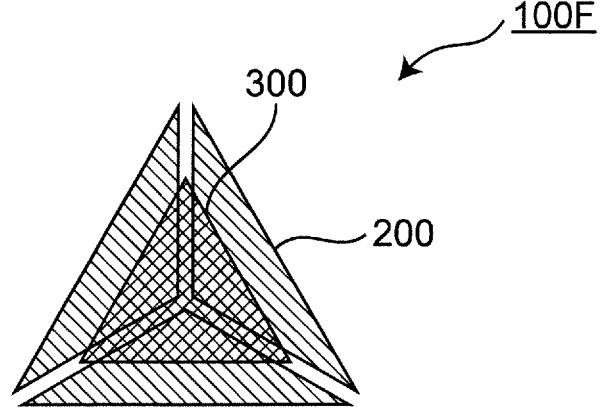
FIG. 2F: A schematic plan transparent view for describing an example of a disposition relationship among a plurality of pressure-sensitive elements and an external force acting portion in a tactile sensor unit, according to the first embodiment of the present disclosure.

For example, as illustrated in FIG. 2F, the number of the pressure-sensitive elements 200 included in a tactile sensor unit 100F is three. The three pressure-sensitive elements 200 each have a triangular shape in a plan view, and occupy a whole region having a triangular shape. In this case, the external force acting portion 300 is disposed to overlap with a part of each of the three pressure-sensitive elements 200.

The plurality of pressure-sensitive elements 200 and the external force acting portion 300 in the tactile sensor units 100B to 100F illustrated in FIGS. 2B to 2F are each similar to the plurality of pressure-sensitive elements 200 and the external force acting portion 300 in the tactile sensor unit 100A illustrated in FIG. 2A, excluding the shapes in a plan view.

An "external force acting portion" in each tactile sensor unit denotes a member (e.g., plate) to which an external force acts, as well as denotes a member (e.g., plate) to which an external force is applied. Specifically, examples of an external force acting portion include not only members (e.g., plates) to be intentionally pushed in various purposes of tactile sensors, but also members (e.g., plates) (members or plates to which an external force acts) not to be intentionally pushed but to be pushed as a result of carrying an object to be carried (e.g., structure object or human body) without allowing the object from dropping.

A shape in a plan view of the external force acting portion 300 is not particularly limited as long as the shape overlaps with at least a part of each of all of the pressure-sensitive elements 200 constituting each tactile sensor unit. Examples of a shape in a plan view of the external force acting portion 300 include a circular shape and a polygonal shape. Specifically, for example, the examples include a square shape as illustrated in FIG. 2A, a hexagonal shape as illustrated in FIGS. 2B and 2C, a circular shape as illustrated in FIGS. 2D and 2E, and a triangular shape as illustrated in FIG. 2F.

It is preferable that the external force acting portion 300 in each tactile sensor unit be, in terms of further improvement on accuracy of detecting a shear force, in a plan view, as illustrated in FIGS. 2A to 2F, smaller in size than a whole region occupied by the plurality of pressure-sensitive elements 200. That is, it is preferable that, in a plan view, an area of the external force acting portion 300 be smaller than an area of a whole region occupied by the plurality of pressure-sensitive elements 200. In terms of similar purposes, it is preferable that, in a plan view, the external force acting portion 300 in each tactile sensor unit be disposed to allow its whole occupied region (contour range) to fall within a range of a whole region occupied by the plurality of pressure-sensitive elements 200 constituting the tactile sensor unit.

It is preferable that a shape in a section view of the external force acting portion 300 in each tactile sensor unit be a plate shape in terms of a simpler structure of the tactile sensor unit. It is preferable that a shape in a section view of the external force acting portion 300 be, in terms of further improvement on accuracy of detecting a shear force, as illustrated in FIG. 1B, a chamfered shape having a width size gradually reducing toward the most-front surface 301. The chamfered shape may be a flat chamfered shape as illustrated in FIG. 1B, or a round chamfered shape. The external force acting portion may wholly have, for example, a truncated cone shape, such as a circular truncated cone and a polygonal truncated cone. Examples of polygonal truncated cone include, for example, triangular truncated cone, square truncated cone, pentagonal truncated cone, hexagonal truncated cone, heptagonal truncated cone, and octagonal truncated cone. A section view denotes a cross-sectional view when viewed in a cross-section.

The external force acting portion 300 may be made of at least one kind of resin material (in particular, polymer material) selected from the group consisting of styrene resin, silicone resin (e.g., polydimethylsiloxane (PDMS)), acrylic resin, rotaxane resin, and urethane resin, for example. It is preferable that a material of the external force acting portion 300 have a modulus of elasticity of $10^5$ Pa or greater, and be, for example, a stiff body, such as glass plate. It is preferable that the external force acting portion 300 be greater in stiffness and modulus of elasticity than the second electrode 3 and a spacer 4.

A width (in particular, maximum width) p of the external force acting portion 300 is not particularly limited as long as an external force being acted is transmitted to pressure-sensitive elements, and may be appropriately determined in accordance with a purpose of a tactile sensor. For example, in tactile sensors for purposes of robot hands and robot arms, the width (in particular, maximum width) p of the external force acting portion 300 normally ranges from 1 mm to 10 mm, and preferably ranges from 1 mm to 5 mm.

A thickness t of the external force acting portion 300 is not particularly limited as long as an external force being acted is transmitted to pressure-sensitive elements, and may be appropriately determined in accordance with a purpose of a tactile sensor. For example, in tactile sensors for purposes of robot hands and robot arms, the thickness t of the external force acting portion 300 normally ranges from 100 μm to 1 mm, and preferably ranges from 500 μm to 1 mm.

It is preferable that the plurality of pressure-sensitive elements 200 in each tactile sensor unit be disposed to allow, in terms of further improvement on accuracy of detecting a shear force, in a plan view, a whole region occupied by the plurality of pressure-sensitive elements 200 to have a shape having a symmetric property. The symmetric property includes at least either point symmetry or line symmetry. As for a shape of a whole region occupied by the plurality of pressure-sensitive elements 200, examples of a whole shape having a symmetric property include a circular shape and a regular polygonal shape. Specifically, for example, the examples include a square shape as illustrated in FIG. 2A, a regular hexagonal shape as illustrated in FIGS. 2B and 2C, a circular shape as illustrated in FIGS. 2D and 2E, and a regular triangular shape as illustrated in FIG. 2F.

The number of the pressure-sensitive elements 200 in each tactile sensor unit is two or more, and normally three or more, and in particular ranges from three to ten. The number of the pressure-sensitive elements 200 in each tactile sensor unit may be four as illustrated in FIG. 2A, six as illustrated in FIG. 2B, three as illustrated in FIGS. 2C, 2E, and 2F, or five as illustrated in FIG. 2D.

In a case where the plurality of pressure-sensitive elements 200 in each tactile sensor unit are disposed to allow, in a plan view, a whole region occupied by the plurality of pressure-sensitive elements 200 to have a whole shape having a symmetric property, it is preferable that, in terms of further improvement on accuracy of detecting a shear force, the external force acting portion 300 be disposed as described below.

The external force acting portion 300 is disposed to allow, as illustrated in FIGS. 2A to 2F, in a plan view, a center of the external force acting portion 300 overlaps with a center of the whole shape having the symmetric property of the plurality of pressure-sensitive elements 200. The centers do not necessarily strictly overlap with each other. For example, when the width (in particular, maximum width) of the external force acting portion 300 is designated as p (mm), a gap of ±0.2×p may be permitted.

A center of an external force acting portion in a plan view denotes a center of gravity of the external force acting portion in a plan view. A center of gravity of an external force acting portion denotes a point of support in a balanced manner for a homogeneous material (e.g., paper) cut in conformity to a contour of the external force acting portion. A center of a whole shape having a symmetric property of a plurality of pressure-sensitive elements in a plan view denotes a center of gravity of the whole shape of the plurality of pressure-sensitive elements in a plan view. A center of gravity of a whole shape of a plurality of pressure-sensitive elements denotes a point of support in a balanced manner for a homogeneous material (e.g., paper) cut in conformity to a contour of the whole shape of the plurality of pressure-sensitive elements.

It is preferable that the external force acting portion 300 in each tactile sensor unit be disposed to allow, in terms of further improvement on accuracy of detecting a shear force, as illustrated in FIGS. 2A to 2F, in a plan view, a contour line of the external force acting portion to pass through a center of each of the plurality of pressure-sensitive elements 200. A fact that a contour line of an external force acting portion passes through a center of each of the plurality of pressure-sensitive elements 200 does not necessarily strictly denote that the contour line passes through the center of each of the plurality of pressure-sensitive elements 200. For example, as illustrated in FIG. 1B, when a width (in particular, maximum width) of the pressure-sensitive element 200 is designated as w (mm), a gap of ±0.2×w may be permitted. FIG. 1B is a cross-sectional view passing through a center of each of the pressure-sensitive elements 200 in a plan view. A position of a contour line of the external force acting portion 300 in a plan view corresponds to a position of a reference numeral "302" in the cross-sectional view of FIG. 1B. A center of a pressure-sensitive element in a plan view denotes a center of gravity of the pressure-sensitive element in a plan view. A center of gravity of a pressure-sensitive element denotes a point of support in a balanced manner for a homogeneous material (e.g., paper) cut in conformity to a contour of the pressure-sensitive element.

The external force acting portion 300 in each tactile sensor unit does not have to be necessarily fixed to all of the pressure-sensitive elements 200 constituting the tactile sensor unit. However, it is preferable that, in terms of further improvement on accuracy of detecting a shear force, the external force acting portion 300 in each tactile sensor unit be fixed to all of the pressure-sensitive elements 200 constituting the tactile sensor unit. Such fixation may be achieved through use of an electrically insulative adhesive used so far in fields of tactile sensors and pressure-sensitive elements.

Each of the plurality of pressure-sensitive elements 200 constituting each tactile sensor unit includes a first substrate 10 including a first electrode 1, the second electrode 3 disposed facing the first electrode 1, and a dielectric 2 disposed between the first electrode 1 and the second electrode 3. The width (in particular, maximum width) w of each of the pressure-sensitive elements 200 (see FIG. 1B) is not particularly limited as long as a change in electrostatic capacitance can be measured, and may be appropriately determined in accordance with a purpose of a tactile sensor. For example, in tactile sensors for purposes of robot hands and robot arms, the width (in particular, maximum width) w of each of the pressure-sensitive elements 200 normally ranges from 2 mm to 8 mm, and preferably ranges from 2 mm to 5 mm, and more preferably is 4 mm, for example.

The first electrode 1 may be made of any material as long as the material at least has a property called as "conduction property". For example, the first electrode 1 may be made from a conductive layer, a resin structure, or a conductive filler dispersed in the resin structure. The conductive layer may be made of at least one kind of material selected from the group consisting of Au (gold), Ag (silver), Cu (copper), C (carbon), ZnO (zinc oxide), $In_2O_3$ (indium oxide (III)), and $SnO_2$ (tin oxide (IV)). The resin structure may be made of at least one kind of resin material selected from the group consisting of styrene resin, silicone resin (e.g., polydimethylsiloxane (PDMS)), acrylic resin, rotaxane resin, and urethane resin, for example. The conductive filler may be made of at least one kind of material selected from the group consisting of the materials described above or similar materials exemplified as the materials that can constitute a conductive layer. The first electrode 1 may be an electrode provided with a conductive layer through application of a conductive ink on a surface of a resin structure, for example. A material of the first electrode 1 has a modulus of elasticity of $10^8$ Pa or greater, for example. As for "conduction property", the first electrode 1 is required to have at least a resistivity adequately smaller than an impedance of capacitance in a desired frequency band.

In the present embodiment, the first electrode 1 is normally separately formed per each pressure-sensitive element of all of the pressure-sensitive elements 200 constituting the tactile sensor unit. The first electrode 1 may be continuously formed across a plurality of pressure-sensitive elements. At least either of the first electrode 1 and the second electrode 3 described later is required to be separately formed per pressure-sensitive element. A thickness of the first electrode 1 is not particularly limited as long as an external force (external pressing force) changes an electrostatic capacitance between the first electrode 1 and the second electrode 3, and normally ranges from 1 μm to 100 μm, and preferably ranges from 10 μm to 50 μm, and more preferably is 30 μm, for example.

The first substrate 10 is a member including the first electrode 1. The first substrate 10 is required to be made of a material capable of supporting the first electrode. Such a material may be, for example, a resin material (in particular, polymer material), such as polyimide resin, polyolefin resin (e.g., polypropylene resin), polyester resin (e.g., polyethylene terephthalate resin), polycarbonate resin, and polyphenylene sulfide resin.

In terms of stretchability of a tactile sensor, for example, the first substrate 10 may be made of a material having stretchability, for example, at least one kind of material selected from the group consisting of rubber materials, such as silicone rubber, isoprene rubber, butadiene rubber, styrene-butadiene rubber, chloroprene rubber, nitrile rubber, polyisobutylene, ethylene propylene rubber, chlorosulfonated polyethylene, acrylic rubber, fluoro-rubber, epichlorohydrin rubber, and urethane rubber.

The first substrate 10 is normally continuously formed across all pressure-sensitive elements constituting a tactile sensor unit. In a tactile sensor, the first substrate 10 may be continuously formed across all tactile sensor units constituting the tactile sensor, or may be separately formed per each tactile sensor unit. A thickness of the first substrate 10 is not particularly limited as long as the first electrode can be supported, and normally ranges from 10 μm to 200 μm, and, in terms of stretchability of a tactile sensor, preferably ranges from 30 μm to 100 μm, and more preferably is 40 μm, for example.

The first substrate 10 is normally continuously formed across all pressure-sensitive elements constituting each tactile sensor unit.

The dielectric 2 may be made of any material as long as the material at least has a property as a "dielectric". For example, the dielectric 2 may be made of a resin material, a ceramic material, and/or a metal oxide material, for example. Although this is merely an example, the dielectric 2 may be made of at least one kind of material selected from the group consisting of polypropylene resin, polyethylene terephthalate resin, polyimide resin, polyphenylene sulfide resin, $Al_2O_3$, and $Ta_2O_5$, for example.

The dielectric 2 may have a stiffness property or an elastic property. In the present description, the stiffness property denotes a property for resistance against deformation due to an external force. The elastic property denotes a property allowing deformation due to an external force, as well as allowing recovery to an original shape when the external force disappears.

The dielectric 2 may have a modulus of elasticity higher than a modulus of elasticity of a conductive member 32 (in particular, projections 321) not to deform, when an external force is applied, greater than the conductive member 32 (in particular, projections 321). For example, when a modulus of elasticity of the conductive member 32 (in particular, projections 321) ranges from approximately $10^4$ Pa to approximately $10^8$ Pa, the dielectric 2 may have a modulus of elasticity higher than the modulus of elasticity of the conductive member 32. Similarly, the dielectric 2 may have a film morphology where a thickness is smaller in value than an amount of deformation of the conductive member 32 (in particular, projections 321) not to deform, when an external force is applied, greater than the conductive member 32 (in particular, projections 321). The dielectric 2 may contain a material having a resistance value higher than an impedance of capacitance in a desired frequency band.

Figure 3A:
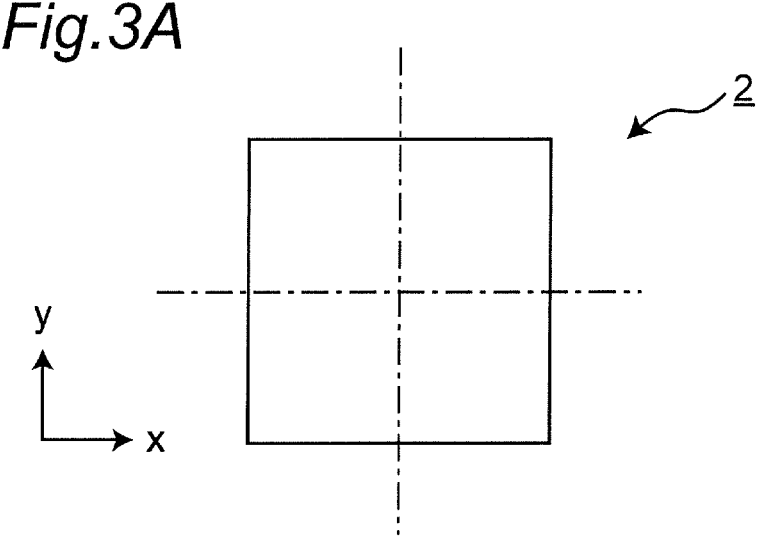
FIG. 3A: A schematic plan view illustrating an example of a forming morphology (shape in a plan view) of a dielectric.
Figure 3B:
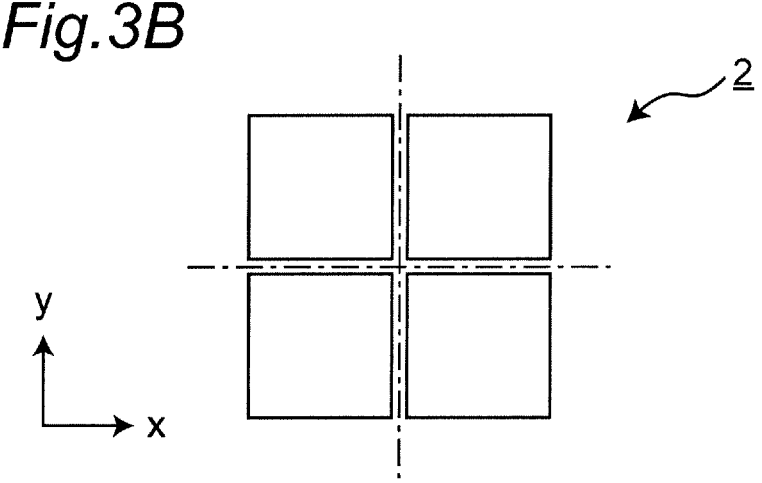
FIG. 3B: A schematic plan view illustrating an example of a forming morphology (shape in a plan view) of dielectrics.

The dielectric 2 may be formed, on the first electrode 1, in a layer shape (layer morphology) on a first surface is facing the second electrode 3. The dielectric 2 is, in FIGS. 1A and 1B, continuously formed on and across all of the pressure-sensitive elements constituting the tactile sensor unit, as illustrated in FIG. 3A. However, as illustrated in FIG. 3B, the dielectric 2 may be separately formed per each pressure-sensitive element. FIGS. 3A and 3B respectively are schematic plan views illustrating examples of forming morphologies (shapes in a plan view) of dielectrics.

The dielectric 2 may be continuously formed across two or more pressure-sensitive elements of all pressure-sensitive elements constituting a tactile sensor unit, or may be separately formed per each pressure-sensitive element. In a tactile sensor, the dielectric 2 may be continuously formed across all tactile sensor units constituting the tactile sensor, or may be separately formed per each tactile sensor unit. A thickness of the dielectric 2 is not particularly limited as long as an external force (external pressing force) changes an electrostatic capacitance between the first electrode 1 and the second electrode 3, and normally ranges from 0.1 μm to 50 μm, and preferably ranges from 1 μm to 20 μm, and more preferably is 7.5 μm, for example.

The second electrode 3 includes the conductive member 32. The conductive member 32 is provided to allow a first surface 320 to face the first electrode 1 and the dielectric 2. The conductive member 32 may have the plurality of projections 321 on the first surface 320. The projections 321 each have, for example, as illustrated in FIG. 1B, a morphology of projecting from a base portion of the conductive member 32 toward the first electrode 1. In other words, the conductive member 32 has an uneven morphology of locally projecting from the base portion in a mounting direction of the first electrode 1. The number of the projections 321 of the conductive member 32 is normally at least one. The number of the projections 321 being provided may be two or more. The conductive member 32 may therefore include the plurality of projections 321. Due to an aspect where the plurality of projections 321 are provided, the conductive member 32 wholly has an uneven morphology. Projections in the uneven morphology correspond to the projections 321.

The projections 321 of the conductive member 32 may each have a tapered shape. Specifically, the projections 321 of the conductive member 32 may each have a tapered shape having a width size gradually reducing toward the first electrode 1 (see FIG. 1B). As illustrated in FIG. 1B, for example, the projections 321 may each wholly have a truncated cone morphology, such as circular truncated cone or square truncated cone.

The projections 321 may each have any height size as long as an external force (external pressing force) changes an electrostatic capacitance between the first electrode 1 and the second electrode 3. The plurality of projections 321 may be regularly arranged. A pitch size of each of the plurality of projections 321 is not particularly limited as long as an external force (external pressing force) changes an electrostatic capacitance between the first electrode 1 and the second electrode 3.

A thickness of the conductive member 32 (in particular, base portion) is not particularly limited as long as an external force (external pressing force) changes an electrostatic capacitance between the first electrode 1 and the second electrode 3, and normally ranges from 10 μm to 500 μm, and preferably ranges from 50 μm to 200 μm, and more preferably is 150 μm, for example.

Figure 4:
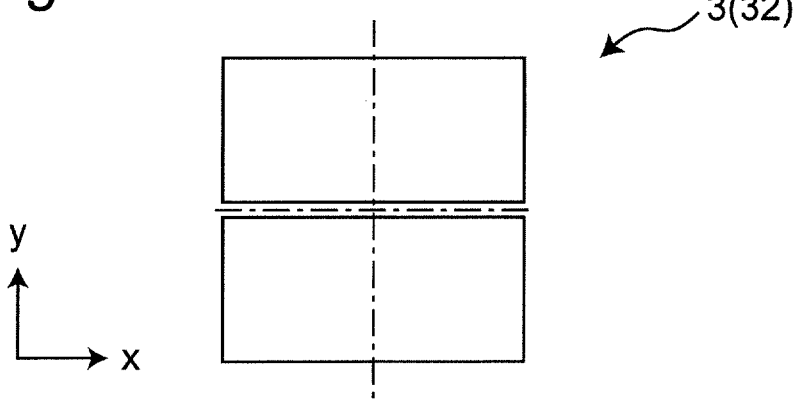
FIG. 4: A schematic plan view illustrating an example of a forming morphology (shape in a plan view) of second electrodes (conductive members).

The conductive member 32 is, in FIGS. 1A and 1B, separately formed per each pressure-sensitive element. However, the conductive member 32 may be continuously formed on and across two or more pressure-sensitive elements of all pressure-sensitive elements constituting a tactile sensor unit. For example, as illustrated in FIG. 4, the conductive member 32 may be continuously formed per each two pressure-sensitive elements of four pressure-sensitive elements constituting a tactile sensor unit. In terms of a simple structure of a tactile sensor unit, it is preferable that the conductive member 32 be continuously formed on and across all pressure-sensitive elements constituting a tactile sensor unit. FIG. 4 is a schematic plan view illustrating an example of a forming morphology (shape in a plan view) of the second electrodes 3 (conductive members 32).

The conductive member 32 is, in FIGS. 1A and 1B, formed to have a width equivalent to a width of the tactile sensor unit 100A. However, formation of the conductive member 32 is not limited to the example. The conductive member 32 may be formed to have a region wider than a region of the tactile sensor unit 100A. Specifically, for example, in a plan view of a tactile sensor including a plurality of the tactile sensor units 100A, the conductive member 32 may be continuously formed on and across a whole surface of the tactile sensor. At this time, in the tactile sensor, such a portion may be present that the conductive member 32 and the first substrate 10 directly come into contact with each other.

The conductive member 32 (in particular, projections 321) may have an elastic property or a stiffness property. In terms of stretchability of a tactile sensor, it is preferable that the conductive member 32 (in particular, projections 321) have an elastic property.

In a case where the conductive member 32 (in particular, projections 321) has an elastic property, the conductive member 32 (in particular, projections 321) corresponds to an elastic electrode member, and is also referred to as a stretchable member. The elastic type conductive member 32 may be made of any material as long as the material has both of an "elastic property (in particular, "elastic property in each of projections 321")" and a "conduction property". For example, an elastic type conductive member 32 (in particular, projections 321) may be made of an electroconductive resin including a resin material (in particular, rubber material) and a conductive filler dispersed in the resin material. A preferable elastic type conductive member 32 (in particular, projections 321) is made of a conductive rubber containing a rubber material and a conductive filler dispersed in the rubber material. With an elastic type conductive member 32 made of a conductive rubber, an external force (pressing force) can be effectively detected, producing a tactile feel when an external force is applied. The resin material may be at least one kind of resin material selected from the group consisting of styrene resin, silicone resin (e.g., polydimethylsiloxane (PDMS)), acrylic resin, rotaxane resin, and urethane resin, for example. The rubber material may be, for example, at least one kind of rubber material selected from the group consisting of silicone rubber, isoprene rubber, butadiene rubber, styrene-butadiene rubber, chloroprene rubber, nitrile rubber, polyisobutylene, ethylene propylene rubber, chlorosulfonated polyethylene, acrylic rubber, fluoro-rubber, epichlorohydrin rubber, and urethane rubber. The conductive filler may be made of at least one kind of material selected from the group consisting of Au (gold), Ag (silver), Cu (copper), C (carbon), ZnO (zinc oxide), $In_2O_3$ (indium oxide (III)), and $SnO_2$ (tin oxide (IV)). Instead of or in addition to the conductive filler, a conductive layer may be used. Specifically, the conductive member 32 may be provided with a conductive layer through application of a conductive ink on a surface of a resin structure (in particular, rubber structure material). In a case where the conductive member 32 has the projections 321, the conductive member 32 is used under a concept of including the projections 321.

A modulus of elasticity of the elastic type conductive member 32, and, in particular, a modulus of elasticity of each of the projections 321 each having elasticity may range from approximately $10^4$ Pa to approximately $10^8$ Pa to allow a normal pressing force (e.g., pressing force ranging from approximately 1 N to approximately 10 N) applied to a tactile sensor to gradually deform each of the projections 321. The modulus of elasticity can be adjusted through a modification of a relative proportion between a conductive filler and a resin material (rubber material). A resistivity of the conductive member 32 may be adequately smaller than an impedance of capacitance in a desired frequency band. The resistivity can also be adjusted through a modification of a relative proportion between a conductive filler and a resin material (rubber material).

With the projections 321 each having elasticity and each formed into a tapered shape, the projections 321 preferably elastically deform, preferably increasing contact regions between the projections 321 and the dielectric 2.

In a case where the conductive member 32 (in particular, projections 321) has a stiffness property, the conductive member 32 (in particular, projections 321) corresponds to a stiff electrode member. The stiff type conductive member 32 may be made of any material as long as the material has both of a "stiffness property (in particular "stiffness property in each of projections 321")" and a "conduction property". The stiff type conductive member 32 (in particular, projections 321) is required to at least have a modulus of elasticity above approximately $10^8$ Pa, and particularly ranging from above $10^8$ Pa to $10^{11}$ Pa or below, and of approximately $5 \times 10^8$ Pa, for example, to disallow, for example, a normal pressing force (e.g., pressing force ranging from approximately 1 N to approximately 10 N) applied to a tactile sensor to deform the stiff type conductive member 32. As for "conduction property", the conductive member 32 (in particular, projections 321) is required to have at least a resistivity adequately smaller than an impedance of capacitance in a desired frequency band.

The stiff type conductive member 32 (in particular, projections 321) may be, for example, made from a metallic body, made from a glass body and a conductive layer formed on a surface of the glass body and/or a conductive filler dispersed in the glass body, or made from a resin body and a conductive layer formed on a surface of the resin body and/or a conductive filler dispersed in the resin body. The metallic body is an electrode member made of metal. That is, the conductive member 32 (in particular, projections 321) may be substantially made of metal. The metallic body is made of at least one kind of metal selected from the group consisting of, for example, Au (gold), Ag (silver), Cu (copper), C (carbon), ZnO (zinc oxide), $In_2O_3$ (indium oxide (III)), and $SnO_2$ (tin oxide (IV)). The glass body is not particularly limited as long as the glass body has a network structure of silicon oxide, and may be made of, for example, at least one kind of glass material selected from the group consisting of silica glass, soda-lime glass, borosilicate glass, and lead glass, for example. The resin body may be made of at least one kind of resin material selected from the group consisting of styrene resin, silicone resin (e.g., polydimethylsiloxane (PDMS)), acrylic resin, rotaxane resin, and urethane resin, for example. The conductive layer for the glass body and the resin body may be a layer formed through vapor deposition with at least one kind of metal selected from the group consisting of metals similar to the metals that can form the metallic body, or may be a layer formed through application, for example, of a conductive ink. The conductive filler for the glass body and the resin body may be made of at least one kind of metal selected from the group consisting of metals similar to the metals that can form the metallic body.

For example, in a case where the stiff type conductive member 32 (in particular, projections 321) is made from a metallic body, or made from a glass body and a conductive layer and/or a conductive filler, its modulus of elasticity normally falls within the range described above. For example, in a case where the stiff type conductive member 32 (in particular, projections 321) is made from a resin body and a conductive layer and/or a conductive filler, its modulus of elasticity can be adjusted through a design of a degree of polymerization and a chemical structure of a resin material constituting the resin body, and through a modification of a relative proportion between the resin material and the conductive filler.

For example, in a case where the stiff type conductive member 32 (in particular, projections 321) is made from a metallic body, or made from a glass body or a resin body and a conductive layer, its resistivity is normally adequately smaller than an impedance of capacitance in a desired frequency band. For example, in a case where the stiff type conductive member 32 (in particular, projections 321) is made from a glass body or a resin body and a conductive filler, its resistivity can be adjusted through a modification of a relative proportion between the conductive filler and a glass material constituting the glass body or a resin material constituting the resin body.

The tactile sensor unit 100A according to the present embodiment includes the spacers 4 between the first electrode 1 (in particular, the dielectric 2) and the second electrode 3 (conductive member 32). However, the spacers 4 do not have to be necessarily provided. In terms of further improvement on accuracy of detecting a shear force, it is preferable that a tactile sensor unit include the spacers 4. The tactile sensor unit 100A according to the present embodiment includes the spacers 4 on the dielectric 2. However, the spacers 4 may be provided on a member other than the dielectric 2 (e.g., first electrode 1 or first substrate 10). For example, in a case where the conductive member 32 is formed in a wider region than a region of the tactile sensor unit 100A, as described above, the spacers 4 may be formed on another member as long as a void 31 can be secured through contact with the conductive member 32. In terms of avoiding, when a tactile sensor is applied onto a curved surface, the dielectric 2 and the second electrode 3 from coming into contact with each other, it is preferable that the tactile sensor unit 100A according to the present embodiment include the spacers 4. The spacers 4 can secure the void (air portion) 31 between the dielectric 2 and the second electrode 3.

Figure 5A:
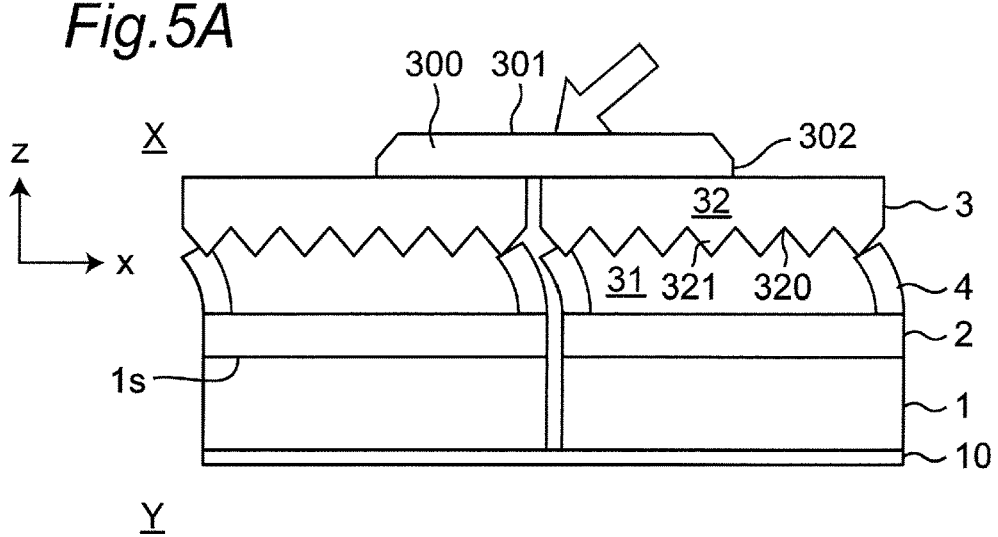
FIG. 5A: A schematic cross-sectional view of the tactile sensor unit including spacers each having a low modulus of elasticity.

In the present embodiment, an available material for a spacer ranges from an elastic body to a stiff body. A material constituting the spacer in the present embodiment is preferably a flexible material having a modulus of elasticity of 0.006 GPa or greater, more preferably a flexible material having a modulus of elasticity ranging from 0.006 GPa to 650 GPa, and further more preferably a flexible material having a modulus of elasticity ranging from 0.1 GPa to 5 GPa. Examples of a preferable flexible material constituting the spacer include polyethylene, polypropylene, and polyester, for example. In a case where a modulus of elasticity of the spacer is equal to or above 0.006 GPa, the spacer does not deform excessively when pressed, effectively detecting a moment. As a result, sensitivity of detecting a shear force further improves. In a case where a modulus of elasticity of the spacer is below 0.006 GPa, as illustrated in FIG. 5A, the spacer deform excessively. As a result, detecting a shear force becomes difficult.

The tactile sensor unit 100A according to the present embodiment preferably includes, as illustrated in FIGS. 1A and 1B, the void 31 between the second electrode 3 and the dielectric 2. However, the void 31 does not have to be necessarily provided. That is, top portions of the projections 321 of the conductive member 32 may come into contact with the dielectric 2. With the tactile sensor unit 100A including the void 31, even when a tactile sensor is applied on a curved surface, the dielectric 2 and the second electrode 3 can be avoided from coming into contact with each other, preventing detection due to such application from erroneously occurring.

Figure 5B:
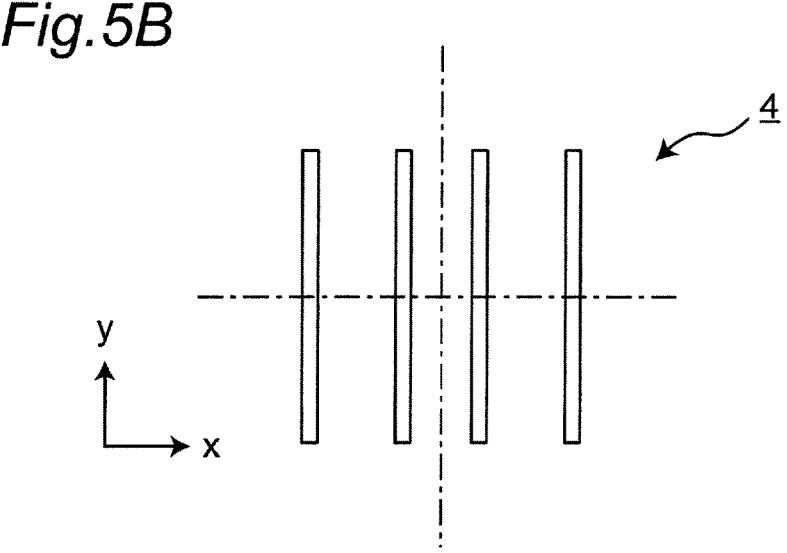
FIG. 5B: A schematic plan view illustrating an example of a forming morphology (shape in a plan view) of the spacers.

The spacers 4 are disposed, as illustrated in FIGS. 1A, 1B, and 5B, on both ends of each of the pressure-sensitive elements 200. However, the present disclosure is not limited to this configuration. For example, a spacer may be disposed at a center portion of each of the pressure-sensitive elements 200. FIG. 5B is a schematic plan view illustrating an example of a forming morphology (shape in a plan view) of the spacers 4.

The spacers 4 may each be made of any material as long as the material does not negatively affect a change in capacitance between the first electrode 1 and the second electrode 3. The spacers 4 may each be made of, for example, an insulative resin material (insulative resin materials such as polyimide resin, polyester resin, and epoxy resin). The spacers 4 may each be formed into a column shape (dot shape), or as illustrated in FIG. 5B, may each be formed into a wall shape (plate shape) where column shapes are arranged in a predetermined direction.

A thickness (height) of each of the spacers 4 is not particularly limited as long as an external force (external pressing force) changes an electrostatic capacitance between the first electrode 1 and the second electrode 3, and normally ranges from 10 μm to 500 μm, and preferably ranges from 20 μm to 100 μm, and more preferably is 50 μm, for example.

The tactile sensor unit 100A may further include, as illustrated in FIG. 1C, a cover material (second substrate) 50 on the most-front surface 301 of the external force acting portion 300. The cover material 50 contributes to further improvement on accuracy of detecting a shear force. In a case where the cover material 50 is used, it is more preferable that the external force acting portion 300 in each tactile sensor unit be fixed to the cover material 50, and be not fixed to all of the pressure-sensitive elements 200 constituting the tactile sensor unit, in terms of further improvement on accuracy of detecting a shear force.

The cover material 50 is required to be made of a material capable of transmitting an external force (external pressing force) between the first electrode 1 and the second electrode 3. Such a material may be at least one kind of material selected from the group consisting of polyimide resin, polyolefin resin (e.g., polypropylene resin), polyester resin (e.g., polyethylene terephthalate resin), polycarbonate resin, and polyphenylene sulfide resin, for example.

A thickness of the cover material 50 is not particularly limited as long as an external force (external pressing force) can be transmitted between the first electrode 1 and the second electrode 3, and normally ranges from 10 μm to 100 μm, and, in terms of adhesion of pressure-sensitive elements onto a three-dimensional curved surface, preferably ranges from 30 μm to 50 μm, and more preferably is 40 μm, for example.

As illustrated in FIGS. 1A and 1B, in a case where both of the first electrode 1 and the second electrode 3 are separately formed per each of the pressure-sensitive elements 200, a change in capacitance is normally detected by a measurement system electrically coupled, per each of the pressure-sensitive elements 200, between a wire pulled out of the first electrode 1 and a wire pulled out of the second electrode 3. Detecting a change in capacitance may conform to either of a self-capacitance system or a mutual capacitance system. Another method may be used to adopt another known system for detecting a change in capacitance. That is, an appropriate system may be adopted as required in accordance with a purpose of a tactile sensor unit, for example. Any known method may be adopted for calculating a load derived from a change in electrostatic capacitance of a tactile sensor unit.

A tactile sensor unit can be used together with a controller. The controller may have, for example, a function of storing or outputting, to an external device, such as a personal computer (PC), a change in electrostatic capacitance or calculated load distribution in a tactile sensor unit. Such a controller may be provided separately from a tactile sensor unit. In this case, for example, the tactile sensor unit may be controlled by an external arithmetic processing unit, such as a PC.

(Capacitance Change Characteristic)

In the present embodiment, a side of the tactile sensor unit 100A is provided with the external force acting portion 300, and serves as a pressing side (external force applying side) of the tactile sensor unit. For example, as illustrated in FIG. 1B, when sides facing each other of the tactile sensor unit 100A are designated as an "X side" (upper side in the drawing) and a "Y side" (lower side in the drawing), the "X side" represents the pressing side (external force applying side). In this aspect, the tactile sensor unit 100A according to the present embodiment receives an external force on the "X side", and detects a shear force, for example.

Figure 6A:
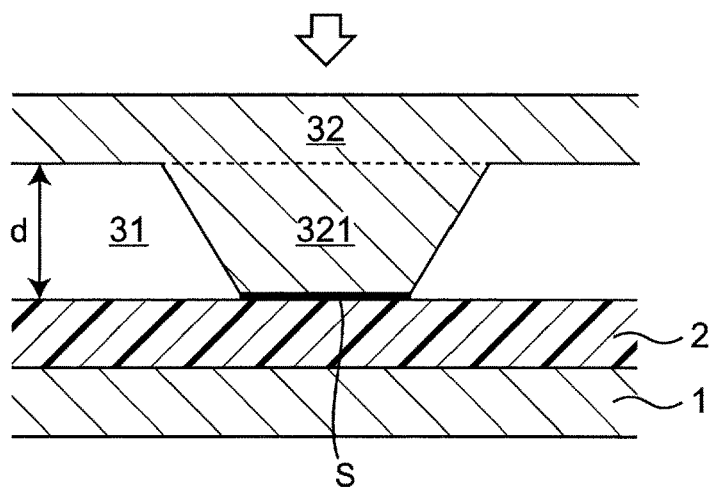
FIG. 6A: A partial enlarged view illustrating behavior around a conductive member when an external force is applied in an example of a tactile sensor unit, according to the first embodiment of the present disclosure.
Figure 6B:
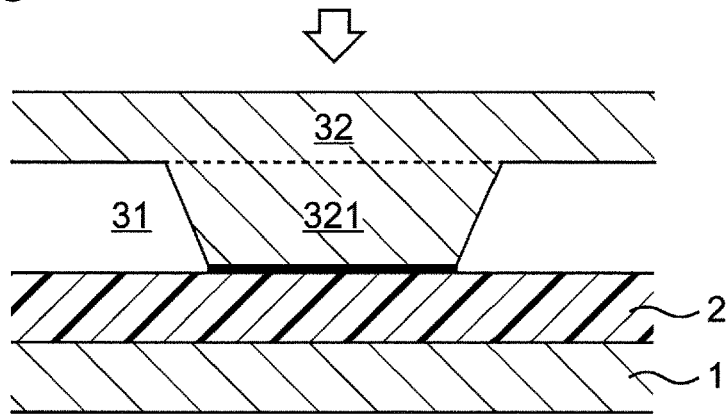
FIG. 6B: A partial enlarged view illustrating behavior around the conductive member when the external force is applied in the example of the tactile sensor unit, according to the first embodiment of the present disclosure.
Figure 6C:
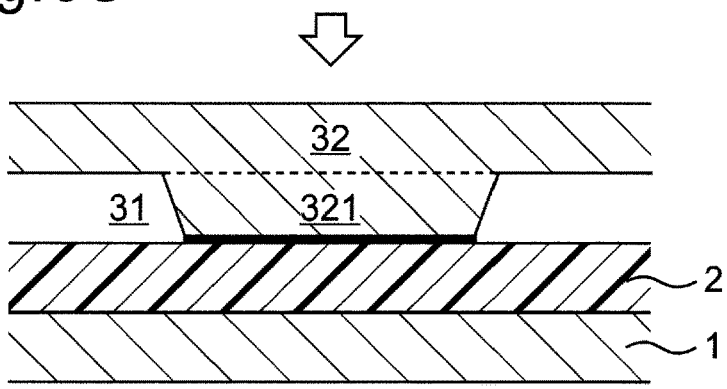
FIG. 6C: A partial enlarged view illustrating behavior around the conductive member when the external force is applied in the example of the tactile sensor unit, according to the first embodiment of the present disclosure.

For example, in a case where the second electrode 3 (in particular, projections 321) has an elastic property, whereas the dielectric 2 has a stiffness property, when an external force is applied on the X side, as illustrated in FIGS. 6A to 6C, the projections 321 each having the elastic property reduce their height size, but gradually increases their width size to deform. As a result, as a contact area S between each of the projections 321 each having the elastic property and the dielectric 2 increases, the void 31 deforms to reduce a thickness d.

Meanwhile, a capacitance C [pF] of a capacitor and a load F [N] applied to a tactile sensor unit are respectively represented by mathematical formulas described below.

$$C = \frac{\varepsilon S}{d} \qquad \text{[Mathematical Formula 1]}$$

$$F = E \cdot eS \qquad \text{[Mathematical Formula 2]}$$

[In the formula, ε [pF/m] is a dielectric constant of a dielectric, S [m$^2$] is a contact area between each of the projections 321 and the dielectric 2, d [m] is a thickness of the void 31, E [Pa] is a Young's modulus, and e is strain.]

Figure 7A:
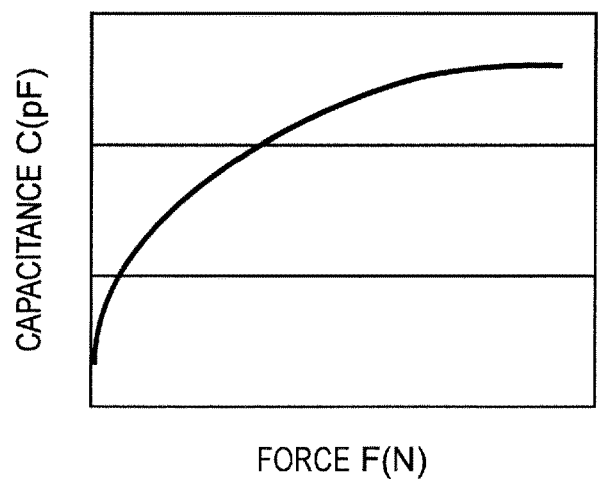
FIG. 7A: A schematic view illustrating a capacitance change characteristic when an external force is applied in a first capacitor portion in a tactile sensor unit, according to the first embodiment of the present disclosure.
Figure 7B:
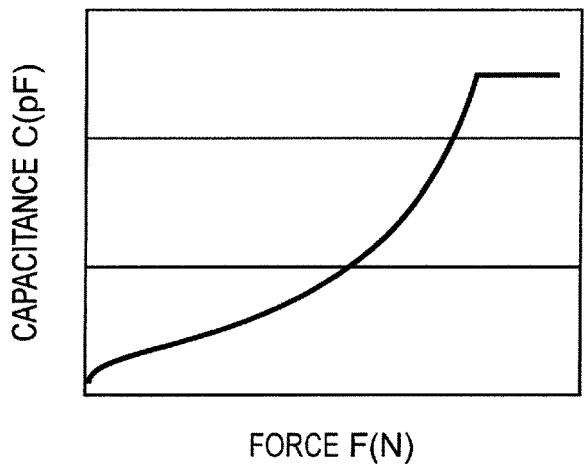
FIG. 7B: A schematic view illustrating a capacitance change characteristic when the external force is applied in a second capacitor portion in the tactile sensor unit, according to the first embodiment of the present disclosure.
Figure 7C:
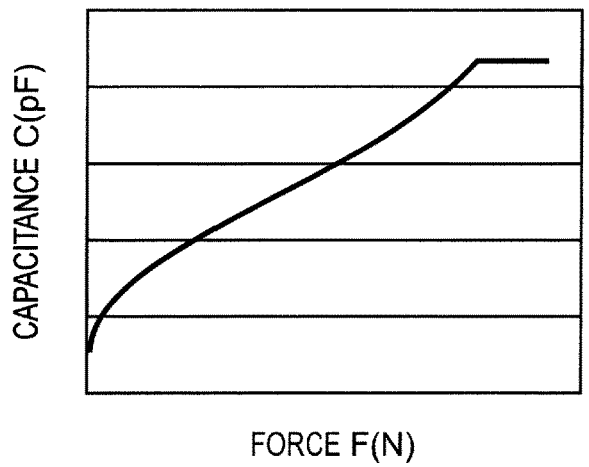
FIG. 7C: A schematic view illustrating an overall capacitance change characteristic when the external force is applied in the tactile sensor unit, according to the first embodiment of the present disclosure.

On the other hand, a portion including the first electrode 1, the dielectric 2, and the second electrode 3 (conductive member 32) can be regarded as a capacitor. In such a capacitor, where a portion including a contact region between each of the projections 321 and the dielectric 2 is referred to as a first capacitor, whereas a portion excluding the contact region is referred to as a second capacitor, an electrostatic capacitance of the first capacitor and an electrostatic capacitance of the second capacitor respectively behave as illustrated in FIGS. 7A and 7B. Specifically, as for the electrostatic capacitance of the first capacitor, as illustrated in FIG. 7A, as the load F increases, a rate of increase of the capacitance C decreases. As for the electrostatic capacitance of the second capacitor, as illustrated in FIG. 7B, as the load F increases, a rate of increase of the capacitance C increases. Therefore, as illustrated in FIG. 7C, the tactile sensor unit can exhibit a high linearity property in a low load region and a high load region. Specifically, in a case where a tactile sensor unit is adjusted for a proportion between a "first capacitor" and a "second capacitor", and accordingly for sensitivity in a low load region and a high load region, the tactile sensor unit with a high linearity property is achieved.

Figure 8:
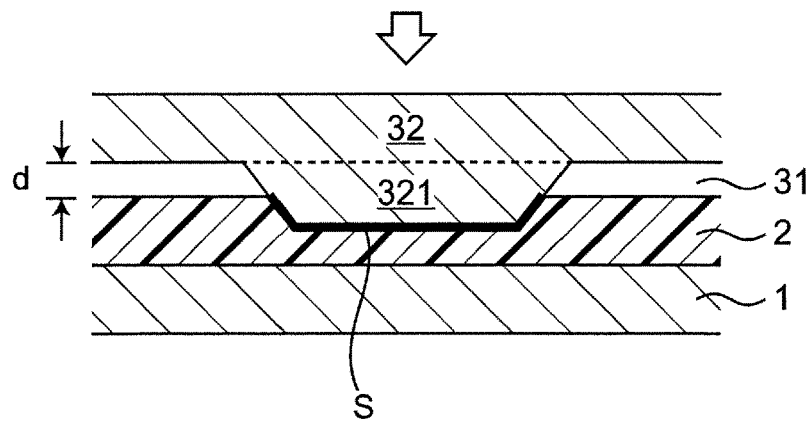
FIG. 8: A partial enlarged view illustrating behavior around a conductive member when an external force is applied in another example of a tactile sensor unit, according to the first embodiment of the present disclosure.

For example, in a case where the second electrode 3 (in particular, projections 321) has an elastic property, and the dielectric 2 has an elastic property, when an external force is applied on the X side, as illustrated in FIG. 8, the dielectric 2 deforms such that at least a part of each of the projections 321 each having the elastic property bites into the dielectric 2, as well as at least the part of each of the projections each having the elastic property deforms. As a result, as a contact area S between each of the projections 321 each having the elastic property and the dielectric 2 increases, the void 31 deforms to reduce a thickness d. Therefore, even in such a case, similar to the case described above, the tactile sensor unit can exhibit a high linearity property in a low load region and a high load region.

Figure 9A:
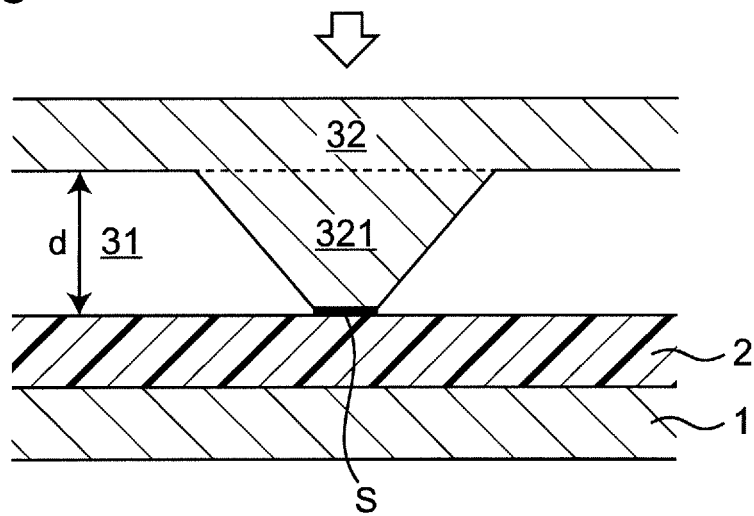
FIG. 9A: A partial enlarged view illustrating behavior around a conductive member when an external force is applied in still another example of a tactile sensor unit, according to the first embodiment of the present disclosure.
Figure 9B:
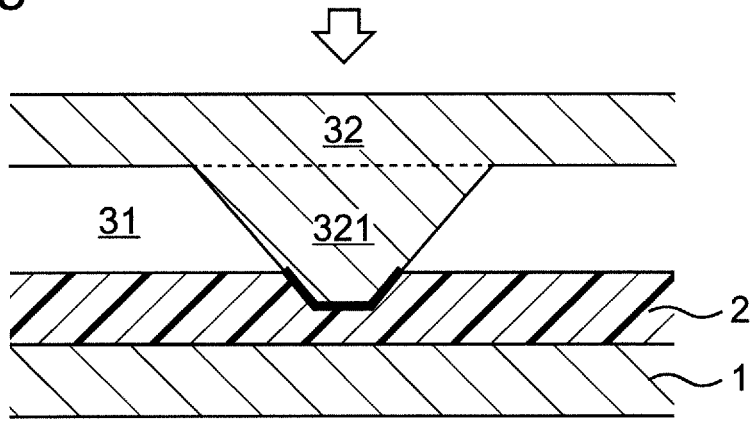
FIG. 9B: A partial enlarged view illustrating behavior around the conductive member when the external force is applied in the still another example of the tactile sensor unit, according to the first embodiment of the present disclosure.
Figure 9C:
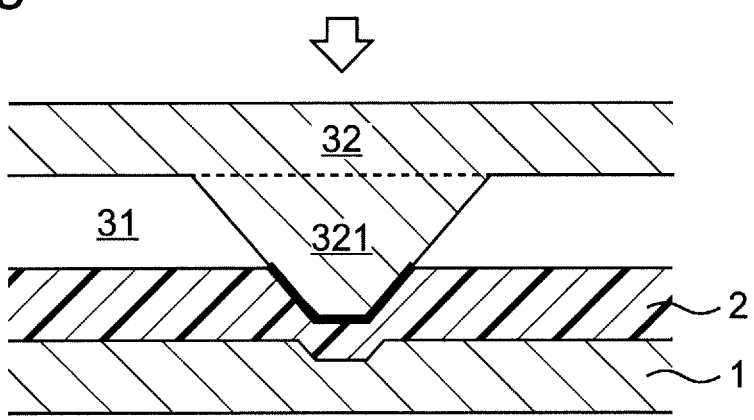
FIG. 9C: A partial enlarged view illustrating behavior around the conductive member when the external force is applied in the still another example of the tactile sensor unit, according to the first embodiment of the present disclosure.

For example, in a case where the second electrode 3 (in particular, projections 321) has a stiffness property, whereas the dielectric 2 has an elastic property, when an external force is applied on the X side, as illustrated in FIGS. 9A to 9B, the dielectric 2 elastically deforms such that at least a part of each of the projections 321 bites into the dielectric 2. As a result, as the contact area S between each of the projections 321 and the dielectric 2 increases, the void 31 deforms to reduce the thickness d. Therefore, even in such a case, similar to the case described above, the tactile sensor unit can exhibit a high linearity property in a low load region and a high load region. At this time, the first electrode 1 may have either an elastic property or a stiffness property. However, in terms of improvement on a linearity property, the first electrode 1 may have an "elastic property" to allow, when an external force is applied, as illustrated in FIG. 9C, the dielectric 2 and the first electrode 1 to elastically deform.

For example, even in a case where the second electrode 3 (in particular, projections 321) has a stiffness property, and the dielectric 2 has a stiffness property, such a tactile sensor unit falls within the scope of the present disclosure. In this case, the contact area S of a region between each of the projections 321 and the dielectric 2 would be less likely to expand. Linearity with respect to a capacitance change characteristic would be accordingly less likely to improve. However, a change in capacitance due to a decrease in the thickness d can be observed. Therefore, a shear force can be detected with a simple structure.

Second Embodiment

A tactile sensor unit 100G according to the second embodiment is similar to the tactile sensor unit 100A according to the first embodiment, excluding a configuration described below.

Figure 10A:
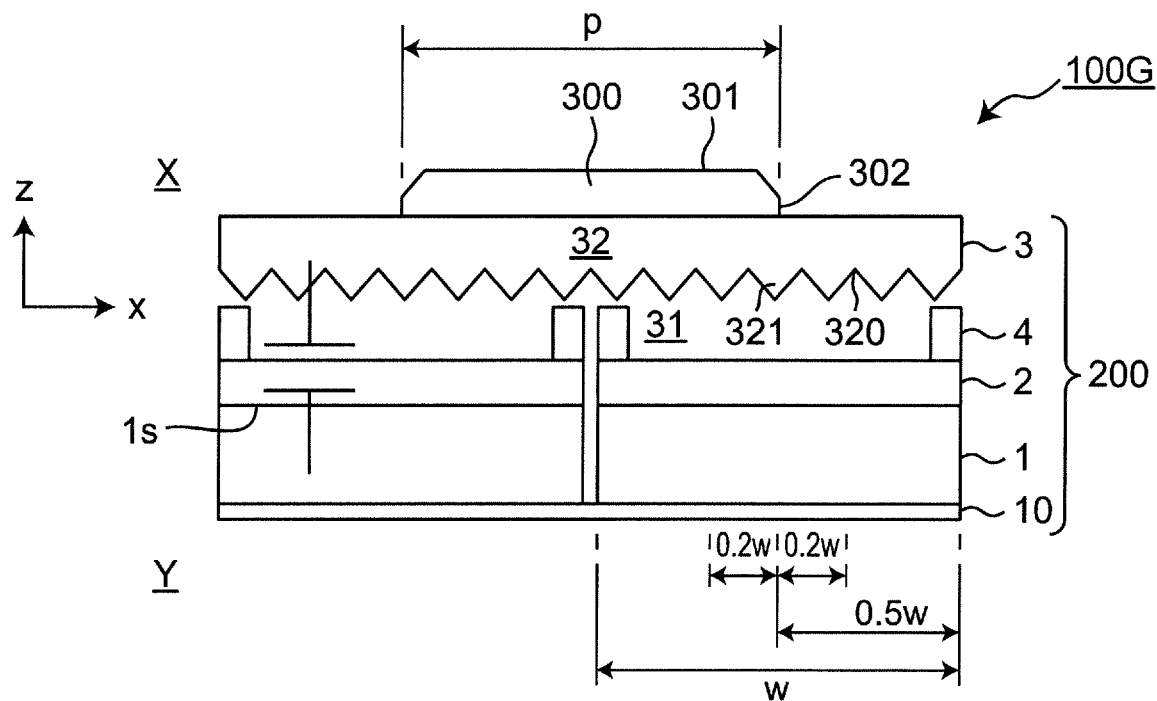
FIG. 10A: A schematic cross-sectional view of a tactile sensor unit according to a second embodiment.

A second electrode 3 (conductive member 32) is continuously formed on and across two or more pressure-sensitive elements 200 of all of the pressure-sensitive elements 200 constituting the tactile sensor unit, as illustrated in FIG. 10A. FIG. 10A is a schematic cross-sectional view of the tactile sensor unit constituting a tactile sensor according to the second embodiment.

With the second electrode 3 (conductive member 32) continuously formed on and across the two or more pressure-sensitive elements 200, it is not necessary that a wire (not illustrated) be pulled out of the second electrode 3 per each of the pressure-sensitive elements 200. This can reduce wires in number, achieving a measurement system having a simple structure. In FIG. 10A, the second electrode 3 (conductive member 32) is continuously formed on and across per two pressure-sensitive elements of the four pressure-sensitive elements constituting the tactile sensor unit, as illustrated in FIG. 4.

Figure 10B:
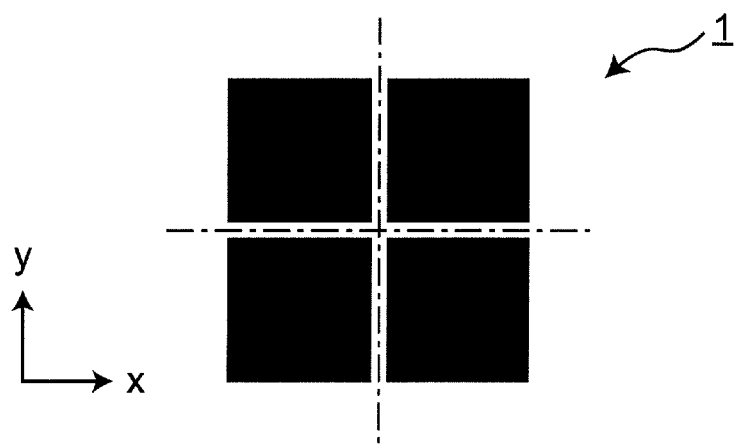
FIG. 10B: A schematic plan view illustrating an example of a forming morphology (shape in a plan view) of first electrodes according to the second embodiment.

In the present embodiment, a first electrode 1 is separately formed per each pressure-sensitive element of all of the pressure-sensitive elements 200 constituting the tactile sensor unit, as illustrated in FIG. 10B. FIG. 10B is a schematic plan view illustrating an example of a forming morphology (shape in a plan view) of the first electrodes 1 according to the second embodiment.

In the present embodiment, a dielectric 2 is separately formed per each pressure-sensitive element of all of the pressure-sensitive elements 200 constituting the tactile sensor unit, as illustrated in FIG. 10A. However, a dielectric may be continuously formed on and across two or more of the pressure-sensitive elements 200, as illustrated in FIG. 1B.

A capacitance change characteristic of the tactile sensor unit according to the present embodiment is similar to the capacitance change characteristic of the tactile sensor unit according to the first embodiment.

Third Embodiment

A tactile sensor unit 100H according to the third embodiment is similar to the tactile sensor unit 100G according to the second embodiment, excluding a configuration described below.

Figure 11A:
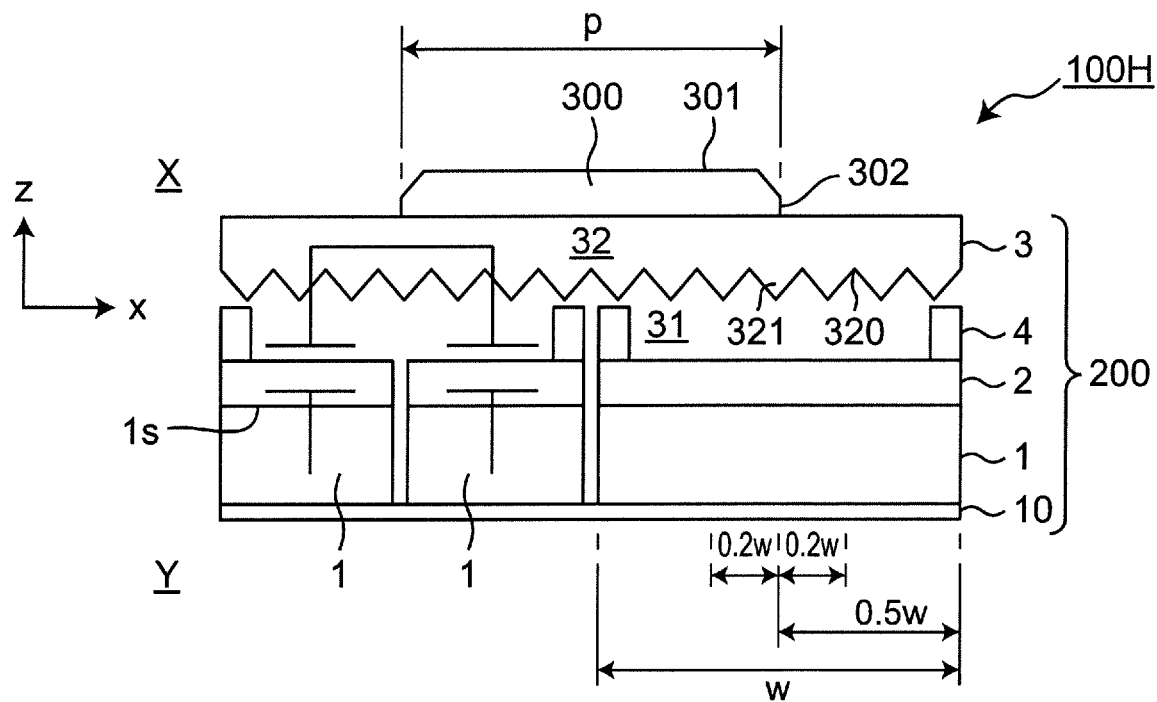
FIG. 11A: A schematic cross-sectional view of a tactile sensor unit according to a third embodiment.
Figure 11B:
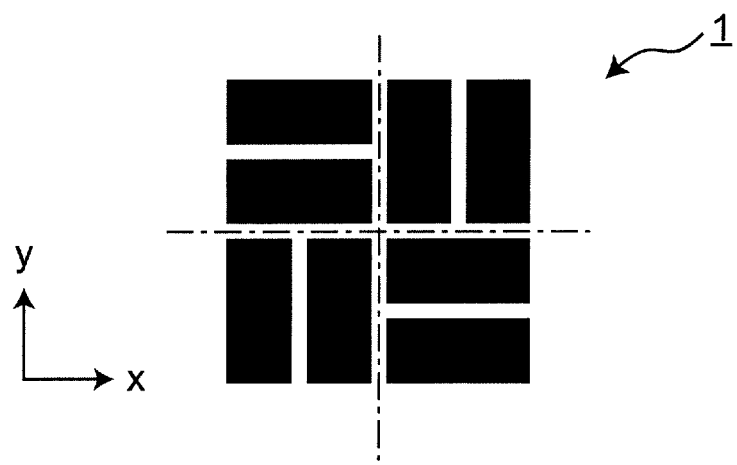
FIG. 11B: A schematic plan view illustrating an example of a forming morphology (shape in a plan view) of first electrodes according to the third embodiment.

As illustrated in FIGS. 11A and 11B, one first electrode 1 is not only separately formed per each pressure-sensitive element of all of pressure-sensitive elements 200 constituting the tactile sensor unit, but also divided into two, and the two first electrodes 1 are formed per each pressure-sensitive element. FIG. 11A is a schematic cross-sectional view of the tactile sensor units constituting a tactile sensor according to the third embodiment. FIG. 11B is a schematic plan view illustrating an example of a forming morphology (shape in a plan view) of the first electrodes 1 according to the third embodiment.

In the present embodiment, the one first electrode 1 is divided into two, and the two first electrodes 1 are formed per each pressure-sensitive element. By pulling wires (not illustrated) respectively out of the two first electrodes 1 in each pressure-sensitive element, it is not necessary that a wire (not illustrated) be pulled out of a second electrode 3 (conductive member 32). Such a structure that wires are respectively pulled out of the two first electrodes 1 per each pressure-sensitive element is achieved at work efficiency equivalent to work efficiency of a structure where a wire is pulled out of the first electrode 1 per each pressure-sensitive element, presenting a simple structure. Therefore, a measurement system according to the present embodiment, where it is not necessary that a wire (not illustrated) be pulled out of the second electrode 3 (conductive member 32), can have a simpler structure than the measurement system according to the second embodiment.

A capacitance change characteristic of the tactile sensor unit according to the present embodiment is similar to the capacitance change characteristic of the tactile sensor unit according to the first embodiment.

In the first to third embodiments described above, each of the tactile sensor units has a single morphology including an external force acting portion per tactile sensor unit. However, each of the tactile sensor units may include two or more external force acting portions per tactile sensor unit. That is, a tactile sensor unit may have a multiple morphology including two or more external force acting portions. The number of external force acting portions in a tactile sensor unit having a multiple morphology is two or more, and may range from two to ten, for example.

In a case where a tactile sensor unit has a multiple morphology, each external force acting portion of two or more external force acting portions is required to have, among a plurality of pressure-sensitive elements overlapping with each external force acting portion, an overlapped disposition relationship, as described above, among an external force acting portion and a plurality of pressure-sensitive elements in a tactile sensor unit having a single morphology. External force acting portions and pressure-sensitive elements in a tactile sensor unit having a multiple morphology are respectively similar to external force acting portions and pressure-sensitive elements in a tactile sensor unit having a single morphology.

For example, each external force acting portion of two or more external force acting portions is required to be disposed on and across a plurality of pressure-sensitive elements. Specifically, each external force acting portion of the two or more external force acting portions is required to be disposed to overlap, in a plan view, with at least a part of each of the plurality of pressure-sensitive elements.

For example, it is preferable that each external force acting portion of two or more external force acting portions be smaller, in a plan view, than a whole region occupied by a plurality of pressure-sensitive elements overlapping with each external force acting portion.

For example, it is preferable that a plurality of pressure-sensitive elements overlapping with each external force acting portion of two or more external force acting portions be disposed to allow a whole region occupied by the plurality of pressure-sensitive elements to have a whole shape having a symmetric property, in a plan view. At this time, it is preferable that each external force acting portion be disposed to allow a center of each external force acting portion to overlap, in a plan view, with a center of the whole shape having the symmetric property.

For example, it is preferable that each external force acting portion of two or more external force acting portions be disposed to allow a contour line of each external force acting portion to pass through, in a plan view, a center of each of a plurality of pressure-sensitive elements overlapping with each external force acting portion.

[Method for Manufacturing Tactile Sensor Unit]

A method for manufacturing the tactile sensor unit according to the present disclosure will now be described. FIGS. 12A to 12D schematically illustrate, in accordance with a preferable aspect, outline processes of the method for manufacturing the tactile sensor unit according to the first embodiment. The processes of the method for manufacturing the tactile sensor unit according to the first embodiment will now be chronologically described. However, the processes are similar to the processes of the method for manufacturing the tactile sensor unit according to the first embodiment, excluding different shapes and sizes of members, for example in the processes.

<Process of Forming First Electrode>

Figure 12A:
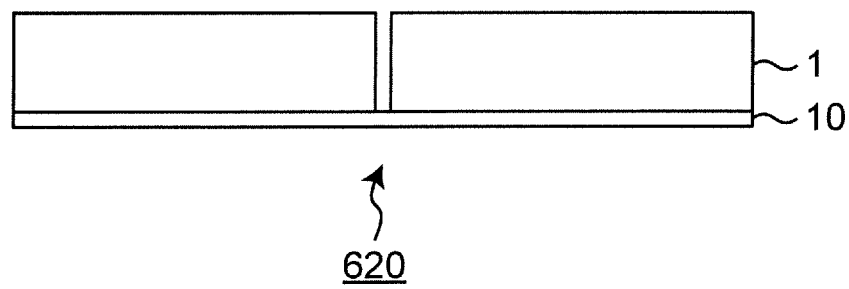
FIG. 12A: A schematic cross-sectional view illustrating a process in a method for manufacturing a tactile sensor unit, according to the present disclosure.

A first electrode sheet (e.g., metal foil) is applied onto one side of the first substrate 10. Wet etching is performed to form the first electrodes 1 to obtain an intermediate 620, as illustrated in FIG. 12A. Specifically, a resist layer is formed on a surface of the first electrode sheet. Exposed portions are dissolved and removed with an etching solution to remove the resist layer. Such application may be achieved through use of an electrically insulative adhesive used so far in fields of tactile sensors and pressure-sensitive elements.

<Process of Forming Dielectric>

Figure 12B:
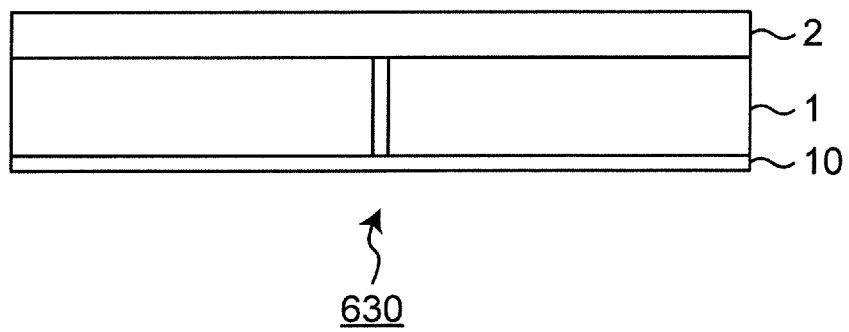
FIG. 12B: A schematic cross-sectional view illustrating a process in the method for manufacturing the tactile sensor unit, according to the present disclosure.

The dielectric 2 is formed on the first electrodes 1 of the intermediate 620 to obtain an intermediate 630, as illustrated in FIG. 12B. Specifically, electrodeposition, for example, may be used. The intermediate 620 is immersed in an electrodeposition coating solution. The first electrodes and a container of the solution are used as electrodes. A voltage is applied to the electrodes to allow an electrodeposition layer to precipitate to form a dielectric. In a case where the dielectric 2 is separately formed per each pressure-sensitive element, a resist layer may be used.

<Process of Forming Spacer>

Figure 12C:
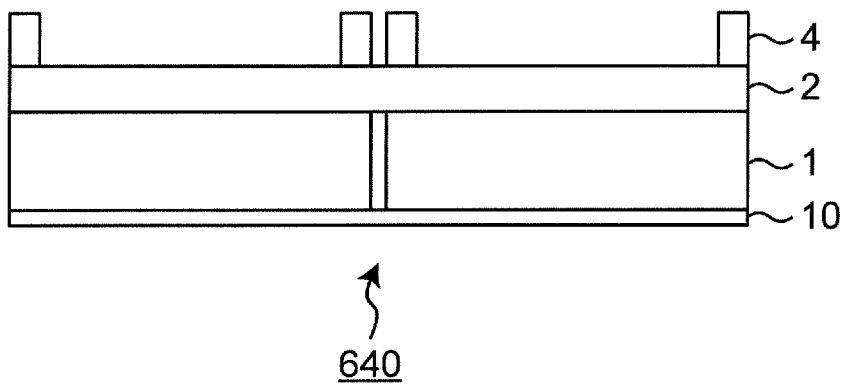
FIG. 12C: A schematic cross-sectional view illustrating a process in the method for manufacturing the tactile sensor unit, according to the present disclosure.

The spacers 4 are formed on a dielectric side of the intermediate 630 to obtain an intermediate 640, as illustrated in FIG. 12C. For example, the intermediate 630 is allowed to undergo photoetching. Specifically, a spacer sheet is applied on the dielectric side of the intermediate 630. Spacer portions are allowed to undergo exposure to generate polymer (e.g., polyimide). After that, unexposed portions are dissolved and removed with an organic solvent, for example. Even in the process, such application may be achieved through use of an electrically insulative adhesive used so far in fields of tactile sensors and pressure-sensitive elements. The process is an optional process.

<Process of Mounting Second Electrode (Conductive Member)>

Figure 12D:
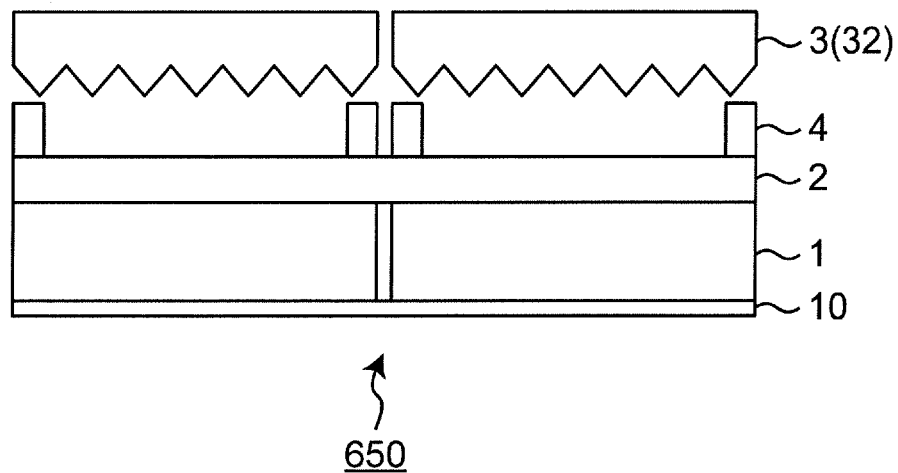
FIG. 12D: A schematic cross-sectional view illustrating a process in the method for manufacturing the tactile sensor unit, according to the present disclosure.

The conductive member 32 serving as a second electrode is mounted on the dielectric 2 of the intermediate 640 and the spacers 4 to obtain an intermediate 650, as illustrated in FIG. 12D. A mounting method is not particularly limited. For example, a simple mounting method and an application method are available. Even in the process, such application may be achieved through use of an electrically insulative adhesive used so far in fields of tactile sensors and pressure-sensitive elements.

The conductive member 32 can be manufactured through, for example, nanoimprint technology, photolithoetching technology, and development and separation technology. Nanoimprint technology is preferably used. Nanoimprint technology is technology where a mold having an uneven pattern is pressed onto a resin body made of a transfer-target material to transfer onto the resin body the pattern formed on the mold in nano-order.

<Process of Mounting External Force Acting Portion>

The external force acting portion 300 is mounted on the conductive member 32 of the intermediate 650 to obtain the tactile sensor unit 100A, as illustrated in FIG. 1B. Even in the process, no mounting method is particularly limited. For example, a simple mounting method and an application method are available. Even in the process, such application may be achieved through use of an electrically insulative adhesive used so far in fields of tactile sensors and pressure-sensitive elements.

[Tactile Sensor]

A tactile sensor according to the present disclosure includes a plurality of tactile sensor units 100 (including 100A to 100H) described above. In terms of stretchability of a tactile sensor, it is preferable that adjacent tactile sensor units (which are adjacent to each other) in the plurality of tactile sensor units be coupled with each other with stretchable members. Stretchable members coupling adjacent tactile sensor units may be stretchable members coupling the external force acting portions 300, stretchable members coupling the first substrates 10, or both of the stretchable members. Specifically, it is preferable that, in terms of stretchability of a tactile sensor, among the plurality of tactile sensor units 100 constituting the tactile sensor according to the present disclosure, at least the external force acting portions 300 be coupled with each other with stretchable members among adjacent tactile sensor units. In terms of further improvement on stretchability of a tactile sensor, it is preferable that, among adjacent tactile sensor units of the plurality of tactile sensor units 100, not only the external force acting portions 300, but also the first substrates 10 be coupled with each other with stretchable members.

In stretchable members used to couple the external force acting portions 300, stretchability may be exerted through its structure, or stretchability may be exerted through its material. That is, stretchable members for the external force acting portions 300 may be members each having a stretchable structure, or members each made of a stretchable material.

Figure 13A:
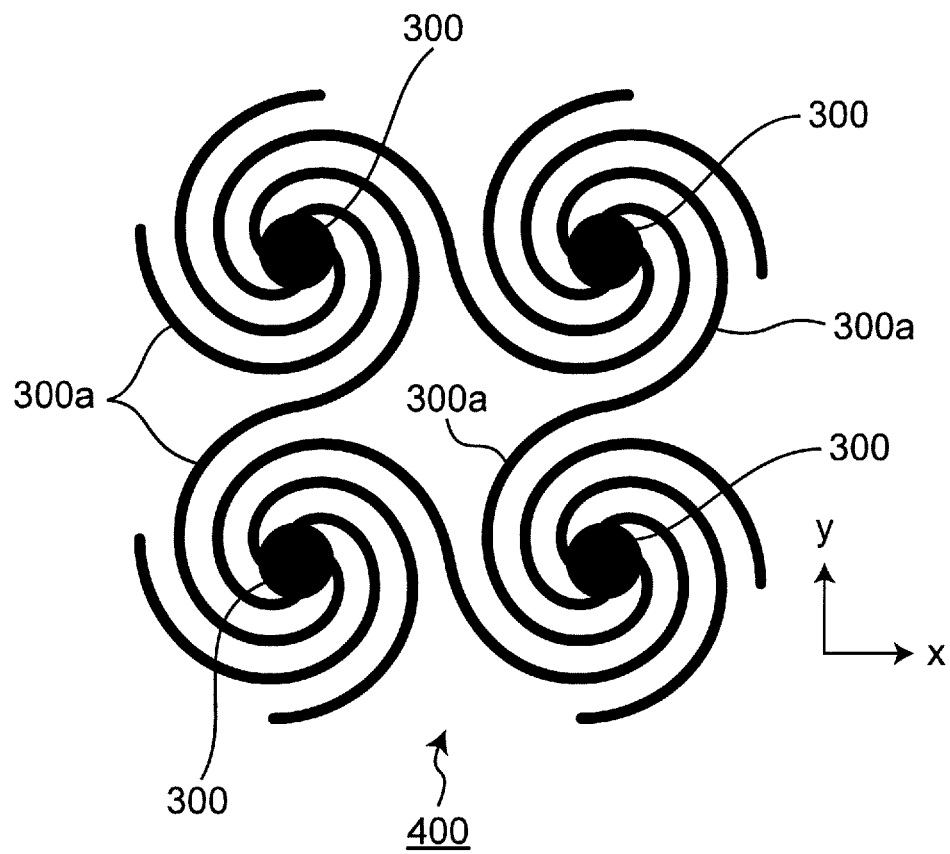
FIG. 13A: A schematic plan view of an external force acting portion net coupled with a plurality of external force acting portions with curved members.

Members each having a stretchable structure and used to couple the external force acting portions 300 are, as illustrated in FIG. 13A, curved members 300a that each have an end coupled to each of outer circumferences of the external force acting portions 300 serving as center portions, and that are respectively provided to extend and curve along the outer circumferences of the center portions. Another end of each of the curved members 300*a* is coupled to the other end of the curved member 300*a* for the external force acting portion 300 in an adjacent tactile sensor unit. In an external force acting portion net 400 where the plurality of external force acting portions 300 are coupled with each other with the curved members 300*a* serving as members each having such a stretchable structure, stretchability is exerted through a change in curvature of each of the curved members 300*a*. As a result, the tactile sensor exerts stretchability. When each of the curved members 300*a* serving as stretchable members extends and contracts, its curvature changes. As a result, the tactile sensor is stretchable. In a case where, in the tactile sensor according to the present disclosure, the external force acting portions 300 of adjacent pressure-sensitive elements are coupled with each other with the curved members (i.e., spiral wires) 300*a*, the curved members 300*a* respectively curving in a plurality of directions allow the external force acting portions 300 to withstand tensile forces in not only upper, lower, left, and right directions, but also diagonal directions, further improving peel strength of the external force acting portions 300. FIG. 13A is a schematic plan view of the external force acting portion net coupled with the plurality of external force acting portions with the curved members. In FIG. 13A, a shape in a plan view of each of the external force acting portions 300 is a circular shape.

The curved members 300*a* may each be made of any material as long as the curved members can withstand a change in curvature. Specific examples of a material each constituting the curved members 300*a* include, for example, a similar resin material (in particular, polymer material) exemplified as the material constituting the external force acting portion 300, and a similar rubber material exemplified as the material constituting the first substrate 10.

The number of the curved members 300*a* coupled to each of the external force acting portions 300 in the external force acting portion net 400 may be determined in accordance with disposition of tactile sensor units and a number of adjacent ones of the external force acting portions 300.

Figure 13B:
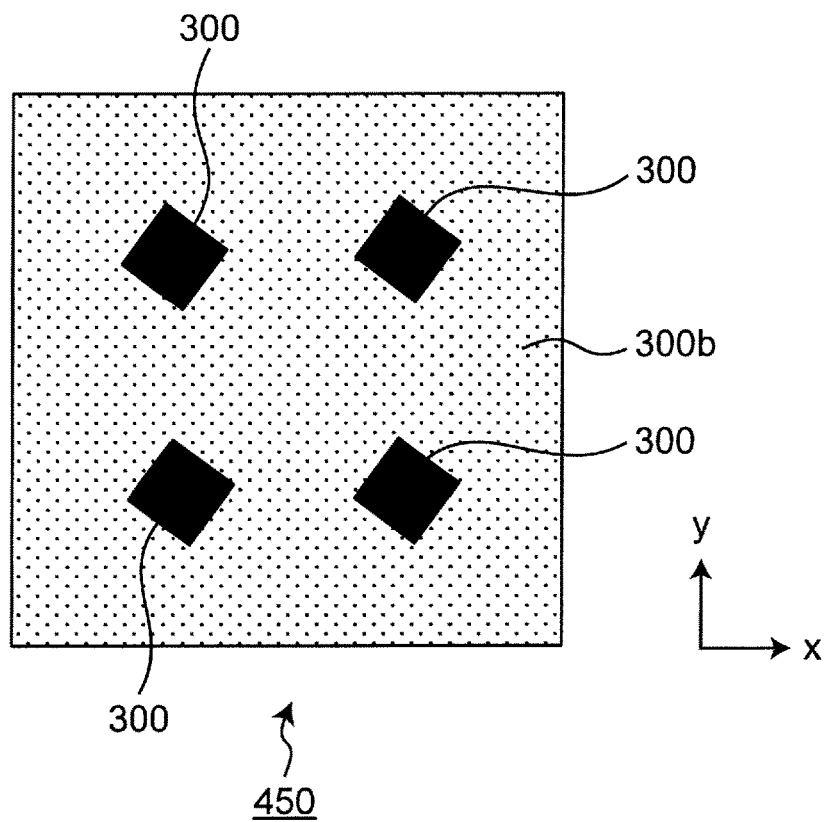
FIG. 13B: A schematic plan view of an external force acting portion sheet coupled with a plurality of external force acting portions with an elastic sheet member.

A member made of a stretchable material and used to couple the external force acting portions 300 is, as illustrated in FIG. 13B, an elastic sheet member 300*b* made of an elastomer material. The plurality of external force acting portions 300 are coupled with each other with the elastic sheet member 300*b*. In an external force acting portion sheet 450 where the plurality of external force acting portions 300 are coupled with each other with the elastic sheet member 300*b* serving as a member made of a stretchable material, as described above, an elastic property of the elastic sheet member 300*b* exerts stretchability. As a result, a tactile sensor exerts stretchability. With the elastic sheet member 300*b* serving as a stretchable member that can extend and contract, the tactile sensor is stretchable. FIG. 13B is a schematic plan view of the external force acting portion sheet coupled with the plurality of external force acting portions with an elastic sheet member.

The elastic sheet member 300*b* may be made of any material having elasticity. Specific examples of a material constituting the elastic sheet member 300*b* include, for example, a similar rubber material exemplified as the material constituting the first substrate 10.

It is preferable that stretchable members used to couple the external force acting portions 300 be members each having a stretchable structure, that is, the curved members 300*a*. When a shear force is applied to the external force acting portions 300 coupled by the curved members 300*a*, a turning force further acts onto the external force acting portions 300. The turning force is used to detect a change in electrostatic capacitance in the pressure-sensitive elements 200. As a result, accuracy of detecting a shear force is further improved. Furthermore, stretchability of a tactile sensor further improves.

Even in stretchable members used to couple the first substrates 10, similar to the stretchable members used to couple the external force acting portions 300, stretchability may be exerted through its structure, or stretchability may be exerted through its material. That is, stretchable members for the first substrates 10 may be members each having a stretchable structure, or members each made of a stretchable material.

Figure 14:
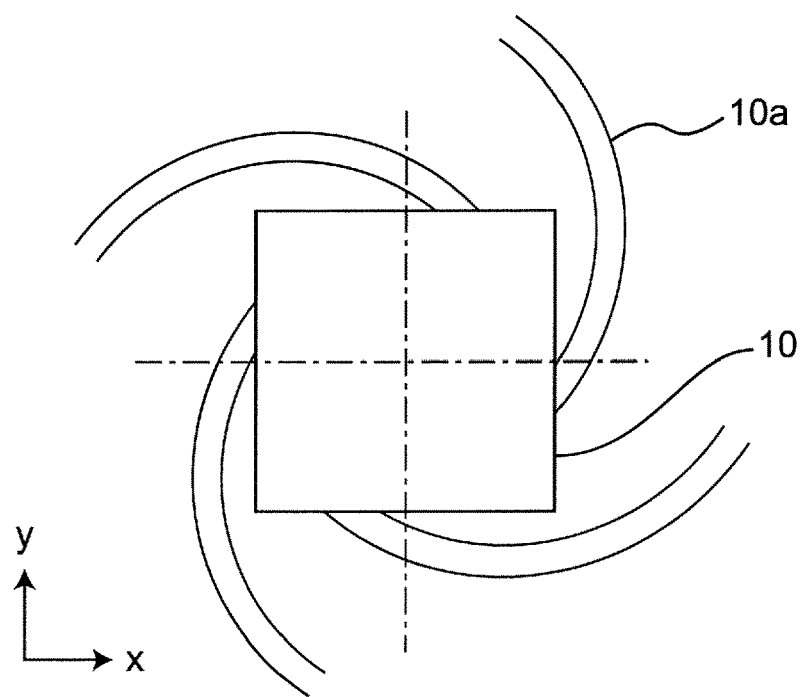
FIG. 14: A schematic plan view of a first substrate including curved members.

Members each having a stretchable structure and used to couple the first substrates 10 are curved members, similar to the members each having the stretchable structure and used to couple the external force acting portions 300. That is, members each having a stretchable structure and used to couple the first substrates 10 are, as illustrated in FIG. 14, curved members 10*a* that each have an end coupled to each of outer circumferences of the first substrates 10 serving as center portions, and that are respectively provided to extend and curve along the outer circumferences of the center portions. Another end of each of the curved members 10*a* is coupled to the other end of the curved member 10*a* for the first substrate 10 in an adjacent tactile sensor unit. In the first substrate net where the plurality of first substrates 10 are coupled with each other with the curved members 10*a* serving as members each having such a stretchable structure, stretchability is exerted through a change in curvature of each of the curved members 10*a*. As a result, the tactile sensor exerts further stretchability. When each of the curved members 10*a* serving as stretchable members extends and contracts, its curvature changes. As a result, the tactile sensor is stretchable. FIG. 14 is a schematic plan view of the first substrate including the curved members.

The curved members 10*a* may each be made of any material as long as the curved members can withstand a change in curvature. Specific examples of a material each constituting the curved members 10*a* include, for example, a similar resin material (in particular, polymer material) and a similar rubber material exemplified as the material constituting the first substrate 10.

The number of the curved members 10*a* coupled to each of the first substrates 10 in the first substrate net may be determined in accordance with disposition of tactile sensor units and the number of adjacent ones of the first substrates 10.

A member made of a stretchable material and used to couple the first substrates 10 is an elastic sheet member made of an elastomer material, similar to the member made of a stretchable material and used to couple the external force acting portions 300. The plurality of first substrates 10 are coupled with each other with the elastic sheet member. In the first substrate sheet where the plurality of first substrates 10 are coupled with each other with an elastic sheet member serving as a member made of such a stretchable material, stretchability is exerted through an elastic property of the elastic sheet member. As a result, the tactile sensor exerts further stretchability. With the elastic sheet member serving as a stretchable member that can extend and contract, the tactile sensor is stretchable.

The elastic sheet member used to couple the first substrates 10 may be made of any material having elasticity. Specific examples of a material constituting the elastic sheet member include, for example, a similar rubber material exemplified as the material constituting the first substrate 10.

It is preferable that stretchable members used to couple the first substrates 10 be members each having a stretchable structure, that is, the curved members 10a. A reason is that use of the curved members 10a as stretchable members used to couple the first substrates 10, as well as use of the curved members 300a as stretchable members used to couple the external force acting portions 300 further improve stretchability of a tactile sensor.

In terms of further improvement on stretchability of a tactile sensor, it is preferable that stretchability of a stretchable member for the first substrates 10 be substantially identical to stretchability of a stretchable member for the external force acting portions 300. A fact that stretchability of a stretchable member for the first substrates 10 is substantially identical to stretchability of a stretchable member for the external force acting portions 300 denotes that, when a tactile sensor extends and contracts, a degree of extension and contraction of the first substrate 10 and a degree of extension and contraction of the external force acting portion 300 are proximate to one another. As aspects where stretchability of a stretchable member for the first substrates 10 and stretchability of a stretchable member for the external force acting portions 300 are substantially identical to each other, aspects will be described below. Preferable aspects are Aspects 1 and 2, and a more preferable aspect is Aspect 2.

Aspect 1: an aspect where a stretchable member for the first substrates 10 is the curved member 10a, and a stretchable member for the external force acting portions 300 is the curved member 300a;

Aspect 2: an aspect where, in Aspect 1, a material constituting the curved member 10a for the first substrates 10 and a material constituting the curved member 300a for the external force acting portions 300 are an identical material;

Aspect 3: an aspect where a stretchable member for the first substrates 10 is an elastic sheet member, and a stretchable member for the external force acting portions 300 is the elastic sheet member 300b; and Aspect 4: an aspect where, in Aspect 3, material constituting the elastic sheet member for the first substrates 10 and a material constituting the elastic sheet member 300b for the external force acting portions 300 are an identical material.

In a case where the first substrates 10 are coupled with each other with the curved members 10a, it is preferable that respective wires from the first electrodes 1 be formed on the curved members 10a. This configuration allows a wire to be easy pulled out of each pressure-sensitive element.

Figure 15A:
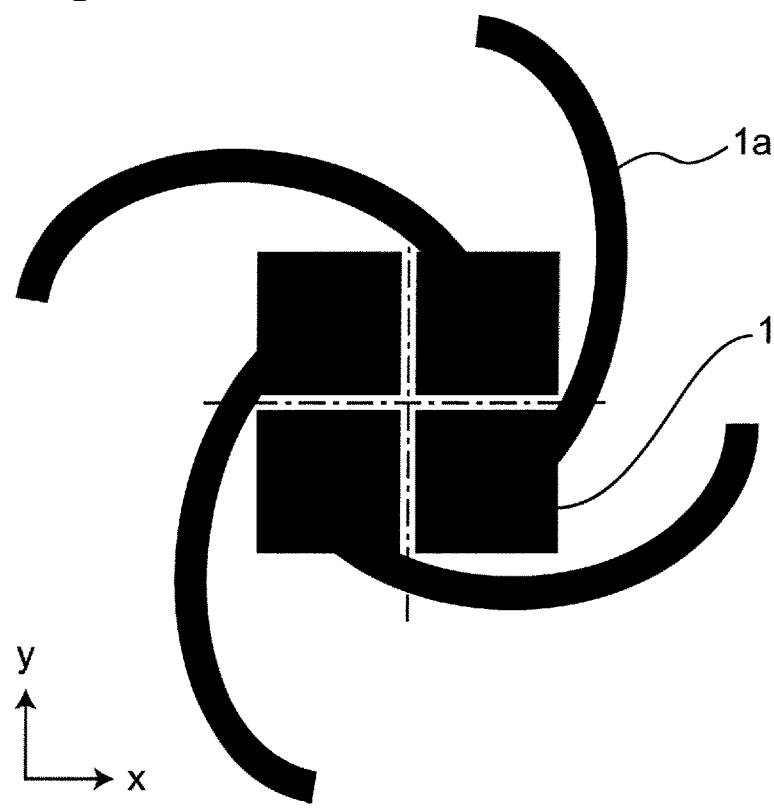
FIG. 15A: A schematic plan view illustrating, in a case where the first electrodes illustrated in FIG. 10B are formed on the first substrate illustrated in FIG. 14, an example of wires respectively pulled out of the first electrodes.

For example, in a case where, as illustrated in FIG. 10B, the first electrodes 1 are each separately formed, per each pressure-sensitive element of all of the pressure-sensitive elements 200 constituting a tactile sensor unit, on the first substrate 10 illustrated in FIG. 14, wires are respectively formed on the curved members 10a for the first substrate 10 to obtain wires 1a illustrated in FIG. 15A. FIG. 15A is a schematic plan view illustrating, in a case where the first electrodes illustrated in FIG. 10B are formed on the first substrate illustrated in FIG. 14, an example of wires respectively pulled out of the first electrodes.

Figure 15B:
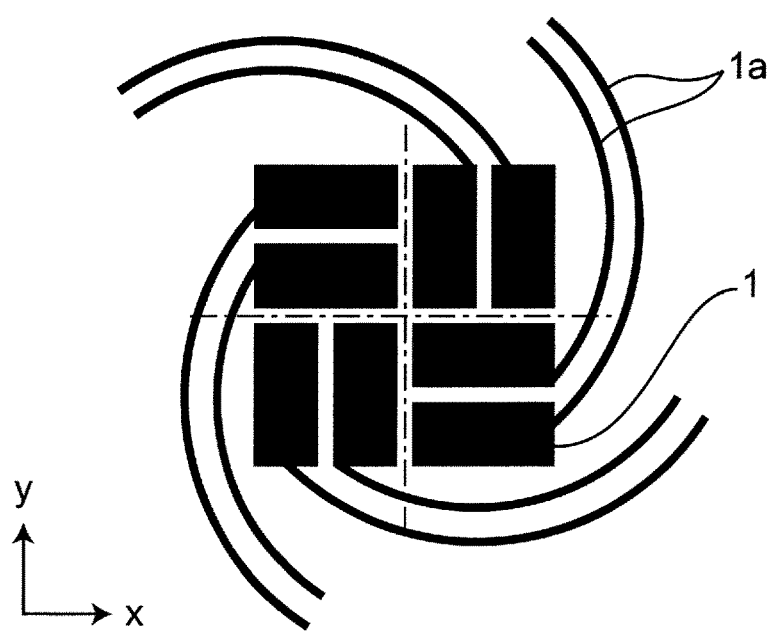
FIG. 15B: A schematic plan view illustrating, in a case where the first electrodes illustrated in FIG. 11B are formed on the first substrate illustrated in FIG. 14, an example of wires respectively pulled out of the first electrodes.

For example, in a case where, as illustrated in FIG. 11B, the first electrodes 1 are not only each separately formed, but also each divided into two and formed, per each pressure-sensitive element of all of the pressure-sensitive elements 200 constituting a tactile sensor unit, on the first substrate 10 illustrated in FIG. 14, two wires are respectively formed on the curved members 10a for the first substrate 10 to obtain the wires 1a illustrated in FIG. 15B. FIG. 15B is a schematic plan view illustrating, in a case where the first electrodes illustrated in FIG. 11B are formed on the first substrate illustrated in FIG. 14, an example of wires respectively pulled out of the first electrodes.

The dielectric 2 may be continuously formed across a plurality of tactile sensor units constituting a tactile sensor, or may be separately formed per each tactile sensor unit. In a case where the plurality of first substrates 10 are coupled with each other with the curved members 10a, and the first electrodes 1 and its wires are respectively formed on the first substrates 10 and the curved members 10a, the first electrodes 1 and its wires and a container of a solution can be used as electrodes in electrodeposition, for example, to selectively form the dielectric 2 on the first electrodes 1 and its wires. The dielectric on the wires can function as an insulation coating layer for the wires.

The second electrode 3 (conductive member 32) may be continuously formed across a plurality of tactile sensor units constituting a tactile sensor, or may be separately formed per each tactile sensor unit. In terms of a simple structure of a tactile sensor, it is preferable that the second electrode 3 (conductive member 32) be continuously formed across all tactile sensor units constituting a tactile sensor. In a case where the second electrode 3 (conductive member 32) is separately formed per each of tactile sensor units constituting a tactile sensor, it is preferable that the second electrodes 3 (conductive member 32) be coupled with each other with curved members each made of a material similar to the material of the second electrode 3 (conductive member 32), similar to a case where the external force acting portions 300 are coupled with each other with the curved members 300a to have a morphology of an external force acting portion net.

Figure 16A:
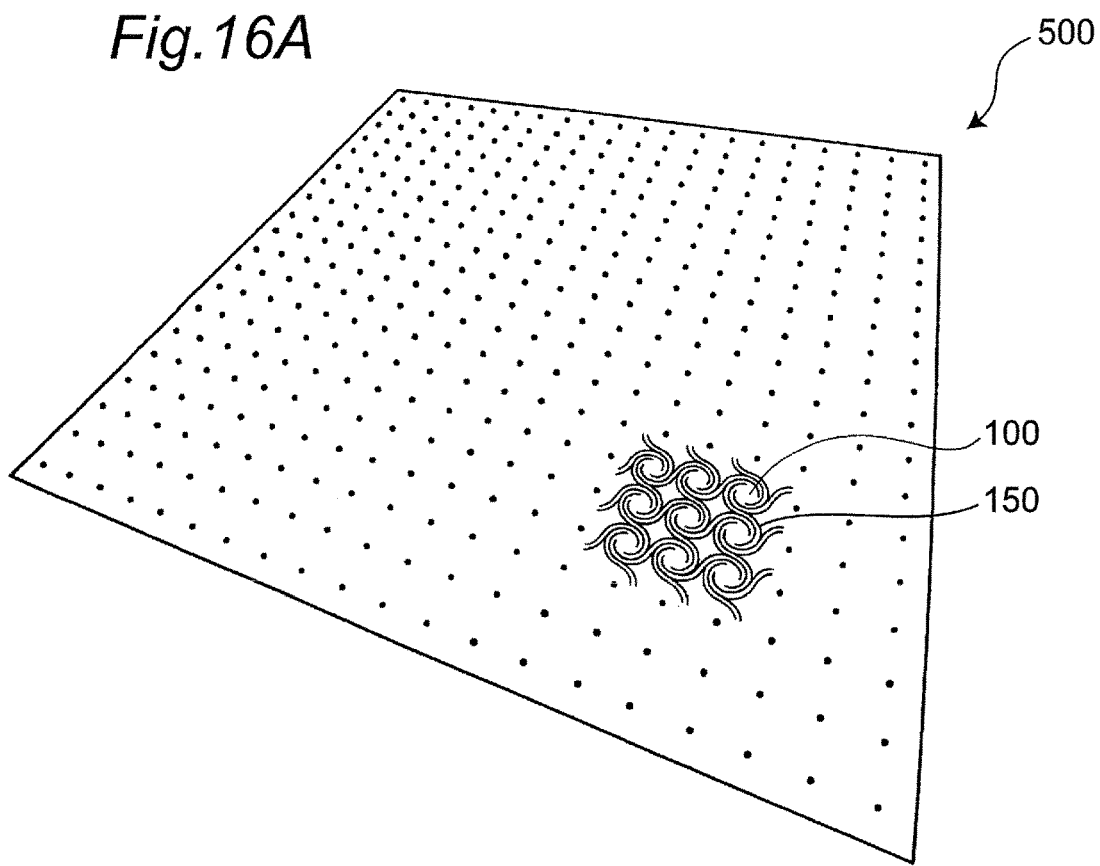
FIG. 16A: A schematic perspective view of an example of a tactile sensor according to the present disclosure.

FIG. 16A illustrates a schematic perspective view of a tactile sensor in a case where the external force acting portions 300 are coupled with each other with curved members across tactile sensor units to have a morphology of an external force acting portion net, the first substrates 10 are coupled with each other with curved members across the tactile sensor units to have a morphology of a first substrate net, and the second electrodes 3 (conductive members 32) are coupled with each other with curved members across the tactile sensor units to have a morphology of a second electrode net. In a tactile sensor 500 illustrated in FIG. 16A, the tactile sensor unit portions 100 serving as center portions are coupled with each other with curved members curved along respective outer circumferences. Examples of curved members 150 coupling the tactile sensor unit portions 100 may include curved members of an external force acting portion net, curved members of a first substrate net, and curved members coupling the second electrodes 3 (conductive members 32). The curved members may be integrally formed with an electrically insulative adhesive. The electrically insulative adhesive may be an electrically insulative adhesive used so far in fields of tactile sensors and pressure-sensitive elements. The curved members 150 may each further include a dielectric.

Figure 16B:
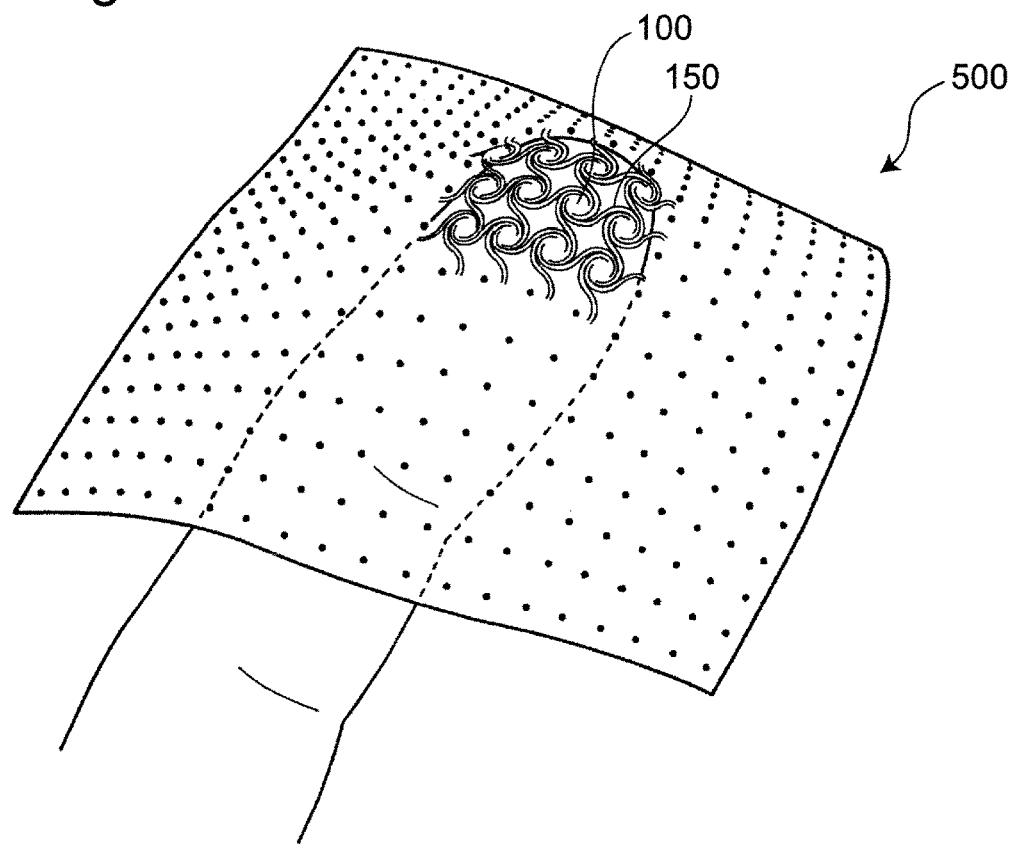
FIG. 16B: A schematic perspective view illustrating a stretched state when the tactile sensor in FIG. 16A is fitted onto a finger of a person.

With its superior stretchability, as illustrated in FIG. 16B, the tactile sensor 500 can be fitted onto an object having a complex shape, such as a finger of a person and a finger and an arm of a robot. Specifically, the present disclosure is applicable to a wearable device demanded for secure sensing when closely and comfortably fitted to a human body including articulations and moving parts other than wrists.

[Method for Manufacturing Tactile Sensor]

A method for manufacturing the tactile sensor according to the present disclosure is similar to the method for manufacturing the tactile sensor unit described above, excluding notes described below.

As the first substrates 10, a first substrate sheet having a size equivalent to a size that allows a desired number of (plurality of) tactile sensor units to be formed is used. Members including the first electrodes 1, the dielectric 2, and the spacers 4, for example are formed on the first substrate sheet. Unnecessary portions are removed. For example, on the first substrate sheet formed with the members described above, a plurality of tactile sensor units portions and curved members of the members described above are cut out through laser cutting. A tactile sensor coupled with a plurality of tactile sensor units with the curved members can thus be obtained.

INDUSTRIAL APPLICABILITY

In addition to typical fields of electronic devices, the tactile sensor according to the present disclosure is available in robotics fields, fields of input devices, fields of steering devices, fields of wearable devices, health care fields, medical fields, and nursing and caring fields, for example.

Specifically, for example, the tactile sensor according to the present disclosure is available as a tactile sensor advantageous for robot hands and robot arms used in factories, for example. Robot hands and robot arms each provided with the tactile sensor according to the present disclosure can grab and carry structure objects and human bodies that can vary in shape and weight, without applying a force more than necessary and without dropping the structure objects and the human bodies.

For example, the tactile sensor according to the present disclosure is available in an input device for a gaming device, for example, in a form of a screen-embedded cross-key, for example.

For example, on a steering device, such as a steering wheel, the tactile sensor according to the present disclosure can detect pressure of how much the steering device is gripped with hands, or of how much the hands are sliding on the steering device, and its change. Such information allows assuming of how much a person is sleepy, as well as of emotion of the person, for example, to achieve sensing of a state of the person (e.g., state of a driver).

EXPLANATION OF REFERENCE NUMERAL

1: First electrode
1a: Curved member
2: Dielectric
3: Second electrode
32: Conductive member
4: Spacer
10: First substrate
10a: Curved member
50: Cover material
100, 100A, 100B, 100C, 100D, 100E, 100F, 100G, 100H: Tactile sensor unit
150: Curved member coupling tactile sensor unit portion
200, 200a, 200b, 200c, 200d: Pressure-sensitive element
300: External force acting portion
500: Tactile sensor

What is claimed is:

1. A tactile sensor unit comprising:
   a plurality of pressure-sensitive elements each including
      a first substrate including a first electrode,
      a second electrode disposed facing the first electrode, and
      a dielectric disposed between the first electrode and the second electrode; and
   an external force acting portion disposed on and across the plurality of pressure-sensitive elements, wherein the external force acting portion has a plate shape and is made of a material that is a stiff body,
   and wherein, when a shear force is applied to the external force acting portion, at least a part of the pressure-sensitive elements change in inter-electrode electrostatic capacitance by a turning force acting onto the external force acting portion in accordance with a magnitude of the shear force.

2. The tactile sensor unit of claim 1, wherein the external force acting portion is disposed, in a plan view, to overlap with at least a part of each of the plurality of pressure-sensitive elements.

3. The tactile sensor unit of claim 1, wherein the external force acting portion is, in a plan view, smaller in size than a whole region occupied by the plurality of pressure-sensitive elements.

4. The tactile sensor unit of claim 1, wherein the plurality of pressure-sensitive elements are disposed, in a plan view, to allow a whole region occupied by the plurality of pressure-sensitive elements to have a whole shape having a symmetric property, and
   the external force acting portion is disposed, in a plan view, to allow a center of the external force acting portion to overlap with a center of the whole shape having the symmetric property.

5. The tactile sensor unit of claim 1, wherein the external force acting portion is disposed, in a plan view, to allow a contour line of the external force acting portion to pass through a center of each of the plurality of pressure-sensitive elements.

6. The tactile sensor unit of claim 1, wherein the plurality of pressure-sensitive elements each further include a spacer between the first electrode and the second electrode, and
   the spacer has a modulus of elasticity ranging from 0.006 GPa to 650 GPa.

7. The tactile sensor unit of claim 1, wherein the plurality of pressure-sensitive elements are three pressure-sensitive elements or more.

8. The tactile sensor unit of claim 1, wherein the external force acting portion has, in a section view, a chamfered shape having a width size gradually reducing toward a most-front surface.

9. The tactile sensor unit of claim 1, wherein the second electrode has a plurality of projections on a first surface facing the first electrode, and
   the second electrode is a conductive member made of conductive rubber.

10. A tactile sensor comprising a plurality of tactile sensor units,
   wherein each of the plurality of tactile sensor unit comprises:
   a plurality of pressure-sensitive elements each including
      a first substrate including a first electrode,
      a second electrode disposed facing the first electrode, and
      a dielectric disposed between the first electrode and the second electrode; and
   an external force acting portion disposed on and across the plurality of pressure-sensitive elements, wherein the external force acting portion has a plate shape and is made of a material that is a stiff body, and wherein, when a shear force is applied to the external force acting portion, at least a part of the pressure-sensitive elements change in inter-electrode electrostatic capacitance by a turning force acting onto the external force acting portion in accordance with a magnitude of the shear force.

11. The tactile sensor of claim 10, wherein adjacent tactile sensor units of the plurality of tactile sensor units are coupled with each other by stretchable members.

12. The tactile sensor of claim 10, wherein, among adjacent tactile sensor units of the plurality of tactile sensor units, the external force acting portions of the adjacent tactile sensor units are coupled with each other by stretchable members.

13. The tactile sensor of claim 12, wherein the stretchable members coupling the external force acting portions are members that each have a stretchable structure or members that are each made of a stretchable material.

14. The tactile sensor of claim 13, wherein the members that each have the stretchable structure are curved members that each have a first end respectively coupled to each of outer circumferences of the external force acting portions serving as center portions, the curved members being respectively provided to curve and extend along the outer circumferences of the center portions, a second end of each of the curved members is coupled to the second end of the curved member for the external force acting portion in another adjacent one of the tactile sensor units, and due to a change of a curvature of each of the curved members, the tactile sensor exerts stretchability.

15. The tactile sensor of claim 13, wherein each member made of the stretchable material is an elastic sheet member made of an elastomer material, and due to elasticity of the elastic sheet member, the tactile sensor exerts stretchability.

16. The tactile sensor of claim 10, wherein, among adjacent tactile sensor units of the plurality of tactile sensor units, the first substrates of the adjacent tactile sensor units are coupled with each other by stretchable members.

17. The tactile sensor of claim 16, wherein the stretchable members coupling the first substrates are members that each have a stretchable structure or members that are each made of a stretchable material.

18. The tactile sensor of claim 17, wherein the members that each have the stretchable structure are curved members that each have a first end respectively coupled to each of outer circumferences of the first substrates serving as center portions, the curved members being respectively provided to curve and extend along the outer circumferences of the center portions, a second end of each of the curved members is coupled to the second end of the curved member for the first substrate in another adjacent one of the tactile sensor units, and due to a change of a curvature of each of the curved members, tactile sensor exerts stretchability.

19. The tactile sensor of claim 17, wherein the members that are each made of the stretchable material are made of an elastomer material, and due to elasticity of the elastomer material, the tactile sensor exerts stretchability.

20. The tactile sensor of claim 10, wherein, among adjacent tactile sensor units of the plurality of tactile sensor units, the external force acting portions of the adjacent tactile sensor units are coupled with each other by first stretchable members, and the first substrates of the adjacent tactile sensor units are coupled with each other by second stretchable members, and stretchability of the second stretchable members for the first substrates is substantially identical to stretchability of the first stretchable members for the external force acting portions.

* * * * *